United States Patent
Bang et al.

(10) Patent No.: US 8,280,448 B2
(45) Date of Patent: Oct. 2, 2012

(54) HAPTIC EFFECT PROVISIONING FOR A MOBILE COMMUNICATION TERMINAL

(75) Inventors: Ki Soo Bang, Seoul (KR); Jong Hwan Kim, Seoul (KR); Seon Hwi Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 679 days.

(21) Appl. No.: 12/436,046

(22) Filed: May 5, 2009

(65) Prior Publication Data
US 2009/0325645 A1 Dec. 31, 2009

(30) Foreign Application Priority Data
Jun. 27, 2008 (KR) .................... 10-2008-0061814

(51) Int. Cl.
*H04M 1/00* (2006.01)
*G06F 3/041* (2006.01)
(52) U.S. Cl. .................... 455/566; 345/156; 345/173
(58) Field of Classification Search .............. 455/566; 345/156, 173
See application file for complete search history.

(56) References Cited

U.S. PATENT DOCUMENTS

| | | | |
|---|---|---|---|
| 6,125,264 A * | 9/2000 | Watanabe et al. | 340/7.39 |
| 6,418,323 B1 | 7/2002 | Bright et al. | |
| 7,890,863 B2 * | 2/2011 | Grant et al. | 715/702 |
| 7,957,955 B2 * | 6/2011 | Christie et al. | 704/9 |
| 8,014,500 B2 * | 9/2011 | Chou | 379/88.19 |
| 2005/0183036 A1 | 8/2005 | Torii | |

FOREIGN PATENT DOCUMENTS

| | | |
|---|---|---|
| CN | 1392977 | 1/2003 |
| DE | 10126466 | 12/2002 |
| EP | 1310860 | 5/2003 |

OTHER PUBLICATIONS

E. Hoggan et al., "Investigating the Effectiveness of Tactile Feedback for Mobile Touchscreens," CHI Conference Proceedings—Tactile and Haptic User Interfaces, pp. 1573-82, Apr. 2008, XP-002525519.

* cited by examiner

*Primary Examiner* — Khai M Nguyen
(74) *Attorney, Agent, or Firm* — Lee, Hong, Degerman, Kang & Waimey

(57) ABSTRACT

A mobile terminal and a method of controlling the mobile terminal are provided. The method comprises displaying a character input window for inputting a character string through a touch input on a touch screen; receiving an input character string through the character input window; and outputting a control signal for controlling a haptic module to generate a haptic effect corresponding to the configuration of the input character string so that it is possible for a user to easily recognize the configuration of the input character with the sense of touch.

33 Claims, 31 Drawing Sheets

FIG. 12
(a) 
(b) 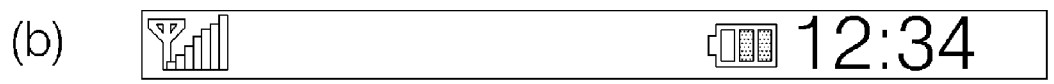
(c) 
(d) 
(e) 
(f) 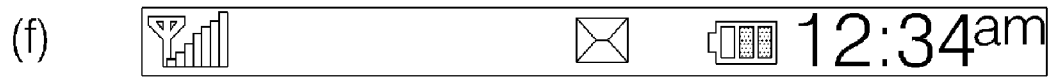
(g) 
(h) 
⋮

(a)  (b)

FIG. 18
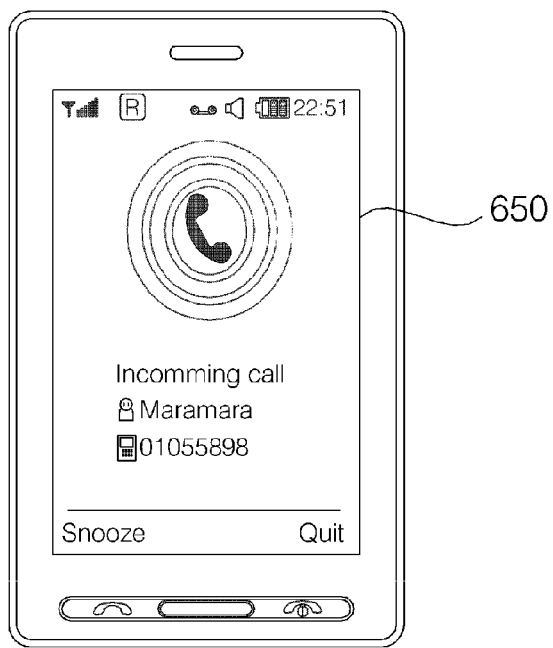
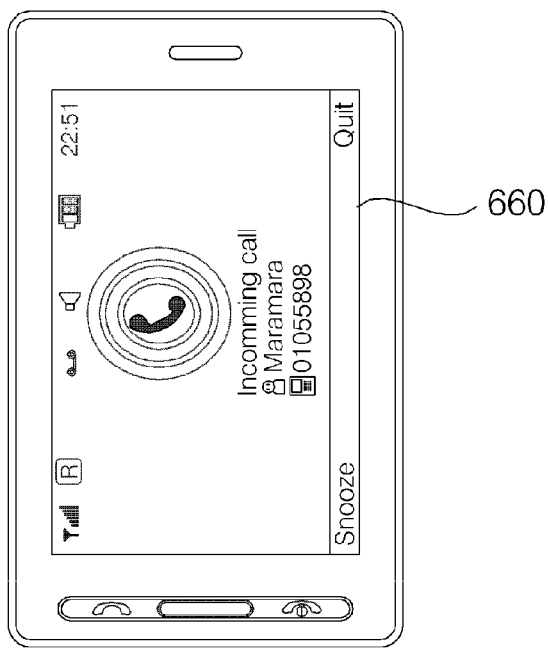
(a) (b)

(a) (b) (c)

FIG. 24
RATE OF CHANGE
| CLASSIFY |
|----------|
| 10% |
| 20% |
| 30% |
| 40% |
| ... |
OBJECT SIZE
| CLASSIFY |
|----------|
| 1/N |
| 2/N |
| 3/N |
| 4/N |
| ... |

(a)           (b)

(a)           (b)

(a)  (b)

(a)  (b)

(a)            (b)

(a)            (b)

(a) (b)

HAPTIC EFFECT PROVISIONING FOR A MOBILE COMMUNICATION TERMINAL

CROSS-REFERENCE TO RELATED APPLICATION

This application claims the priority benefit of Korean Patent Application No. 10-2008-0061814, filed on Jun. 27, 2008 in the Korean Intellectual Property Office, the content of which is incorporated herein in entirety.

RELATED FIELDS

The present invention relates to a mobile terminal, which provides various haptic effects according to the content of information displayed by the mobile terminal or the setting state of the mobile terminal, and a method of controlling the mobile terminal.

BACKGROUND

Mobile terminals are portable devices, which can provide users with various services such as a voice calling service, a video calling service, an information input/output service, and a data storage service. As the types of services provided by mobile terminals diversify, an increasing number of mobile terminals have been equipped with various complicated functions such as capturing photos or moving pictures, playing music files or moving image files, providing game programs, receiving broadcast programs and providing wireless Internet services and have thus evolved into multimedia players.

Various user interface (UI) environments, in which users are allowed to easily search for and choose desired functions, have been developed. In addition, the demand for various designs for mobile terminals such as a double-sided liquid crystal display (LCD) or a full touch screen has steadily grown due to a growing tendency of considering mobile terminals as personal items that can represent users' personality.

In a limited display device, such as a mobile communication terminal, there is a restriction in allocating sufficient space for a UI device (such as a display device or a keypad) of a mobile terminal without compromising the mobility and the portability of a mobile terminal. In addition, conventional mobile terminals provide operating state information or respond to user commands merely using a limited UI space or simple sound effects.

Therefore, systems and methods are needed to control the operation of mobile terminals using through an efficient and easy-to-use user interface.

SUMMARY

A method of controlling a mobile terminal is provided. The method comprises displaying a character input window for inputting a character string through a touch input on a touch screen; receiving an input character string through the character input window; and outputting a control signal for controlling a haptic module to generate a haptic effect corresponding to the configuration of the input character string.

In accordance with one embodiment, a mobile terminal is provided in which a haptic effect is generated when a certain input or output is detected. A user of the mobile terminal may configure the manner in which the haptic effect is produced. For example, if the haptic effect is generated by way of a vibration mechanism, the user may set the level of vibration to be generated when a certain input is provided to the mobile terminal, or when a certain output is generated by the mobile terminal. The input and output to the mobile terminal is thus monitored so that when, for example, a message including a certain word or a certain output, for example, playback of a moving picture having a certain level of lighting or motion is detected, then a particular haptic effect associated with the detected input our output is generated. The user may set different levels or types of haptic effects with different levels or types of input and output.

The mobile terminal includes a touch screen configured to display a character input window for inputting a character string through touch input; a haptic module configured to generate a haptic effect; and a controller configured to receive an input character string through the character input window and to control the haptic module to generate a haptic effect corresponding to the configuration of the input character string.

A method of controlling a mobile terminal comprises receiving a request for connecting a call from a caller; detecting caller information regarding the caller; and outputting a control signal for controlling a haptic module to generate a haptic effect corresponding to the caller information. In one embodiment, a mobile terminal including a wireless communication unit configured to connect a call to another mobile terminal; a haptic module configured to generate a haptic effect; and a controller configured to receive a request for connecting a call from a caller, to detect caller information regarding the caller and to output a control signal for controlling a haptic module to generate a haptic effect corresponding to the caller information.

In one embodiment, the method comprises displaying one or more menu icons; choosing one of the menu icons; and outputting a control signal for controlling a haptic module to generate a haptic effect corresponding to the chosen menu icon. The mobile terminal may comprise a touch screen configured to display one or more menu icons; a haptic module configured to generate a haptic effect; and a controller configured to outputting a control signal for controlling a haptic module to generate a haptic effect corresponding to whichever of the menu icons is chosen.

The above and other features and advantages will become more apparent by describing in detail preferred embodiments thereof with reference to the attached drawings.

BRIEF DESCRIPTION OF THE DRAWINGS

FIGS. 12 through 21 illustrate diagrams for explaining how to generate a haptic effect in accordance with a change in a screen image displayed by a display unit of the mobile terminal shown in FIG. 1;

FIGS. 22 through 28 illustrate diagrams for explaining how to generate and store a haptic effect during the play of a moving image file in accordance with one embodiment.

DETAILED DESCRIPTION OF EXEMPLARY EMBODIMENTS

Figure 1:
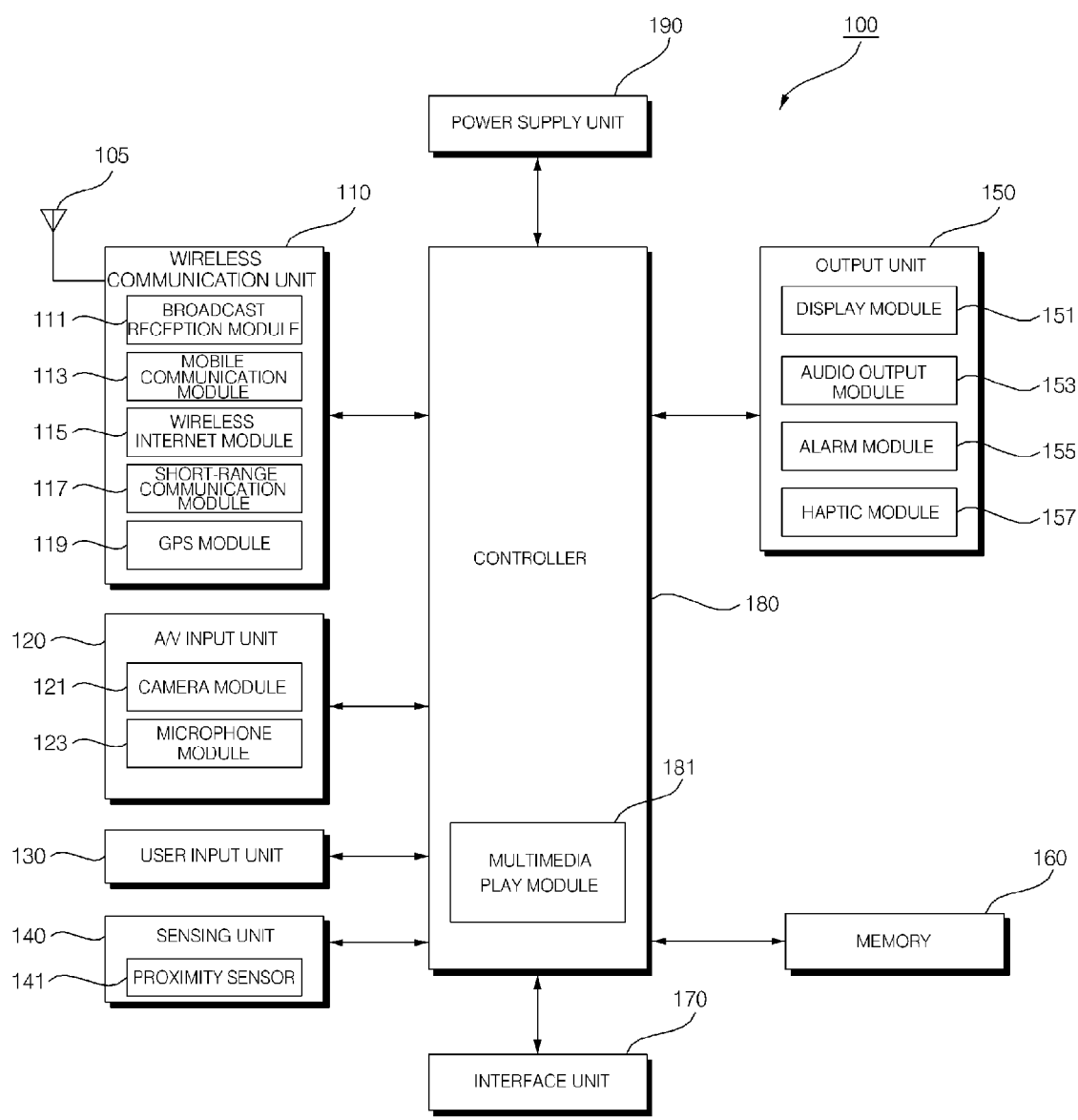
FIG. 1 illustrates a block diagram of a mobile terminal according to an exemplary embodiment of the present invention.

The term 'mobile terminal', as used herein, may indicate a mobile phone, a smart phone, a laptop book computer, a digital broadcast receiver, a personal digital assistant (PDA), a portable multimedia player (PMP), or a navigation device. FIG. 1 illustrates a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into two or more smaller units.

The wireless communication unit 110 may include a broadcast reception module 111, a mobile communication module 113, a wireless Internet module 115, a short-range communication module 117, and a global positioning system (GPS) module 119. The broadcast reception module 111 receives a broadcast signal and/or broadcast-related information from an external broadcast management server through a broadcast channel. Examples of the broadcast channel include a satellite channel and a terrestrial channel. The broadcast management server may be a server which generates broadcast signals and/or broadcast-related information and transmits the generated broadcast signals and/or the generated broadcast-related information or a server which receives and then transmits previously-generated broadcast signals and/or previously-generated broadcast-related information.

Examples of the broadcast-related information include broadcast channel information, broadcast program information and broadcast service provider information. Examples of the broadcast signal include a TV broadcast signal, a radio broadcast signal, a data broadcast signal, or the combination of a data broadcast signal and either a TV broadcast signal or a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms, for example, electronic program guide (EPG) of digital multimedia broadcasting (DMB) or electronic service guide (ESG) of digital video broadcast-handheld (DVB-H).

The broadcast reception module 111 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 111 may be configured to be suitable for nearly all types of broadcasting systems other than those set forth herein. The broadcast signal and/or the broadcast-related information received by the broadcast reception module 1110 may be stored in the memory 160.

The mobile communication module 113 transmits wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages. The mobile communication module 113 may be a module for wirelessly accessing the Internet. The mobile communication module 113 may be embedded in the mobile terminal 100 or may be installed in an external device. The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee.

The GPS module 119 may receive position information from a plurality of GPS satellites. The A/V input unit 120 may be used to receive audio signals or video signals. The A/V input unit 120 may include a camera module 121 and a microphone module 123. The camera module 121 processes various image frames such as still images or moving images captured by an image sensor during a video call mode or an image capturing mode. The image frames processed by the camera module 121 may be displayed by a display module 151. The image frames processed by the camera module 121 may be stored in the memory 160 or may be transmitted outside the mobile terminal 100 through the wireless communication unit 110. The mobile terminal 100 may include two or more camera modules 121.

The microphone module 123 receives external sound signals during a call mode, a recording mode, or a voice recognition mode with the use of a microphone and converts the sound signals into electrical sound data. In the call mode, the mobile communication module 1130 may convert the electrical sound data into data that can be readily transmitted to a mobile communication base station and then output the data obtained by the conversion. The microphone module 123 may use various noise removal algorithms to remove noise that may be generated during the reception of external sound signals. The user input unit 130 generates key input data based on user input for controlling the operation of the mobile terminal 100. The user input unit 130 may be implemented as a keypad, a dome switch, a touch pad (either static pressure or constant electricity), a jog wheel, or a jog switch. In particular, if the user input unit 130 is implemented as a touch pad and forms a mutual layer structure along with the display module 151, the user input unit 130 and the display module 151 may be collectively referred to as a touch screen.

The sensing unit 140 determines a current state of the mobile terminal 100 such as whether the mobile terminal 100 is opened up or closed, the position of the mobile terminal 100 and whether the mobile terminal 100 is placed in contact with a user, and generates a sensing signal for controlling the operation of the mobile terminal 100. For example, when the mobile terminal 100 is a slider-type mobile phone, the sensing unit 140 may determine whether the mobile terminal 100 is opened up or closed. In addition, the sensing unit 140 may determine whether the mobile terminal 100 is powered by the power supply unit 190 and whether the interface unit 170 is connected to an external device.

The sensing unit 140 may include a proximity sensor 141. The proximity sensor 141 may determine whether there is an entity nearby and approaching the mobile terminal 100 without any mechanical contact with the entity. More specifically, the proximity sensor 141 may detect an entity that is nearby and approaching by detecting a change in an alternating magnetic field or the rate of change of static capacitance. The sensing unit 140 may include two or more proximity sensors 141. The output unit 150 may output audio signals, video signals and alarm signals. The output unit 150 may include the display module 151, an audio output module 153, an alarm module 155, and a haptic module 157 incorporating haptic technology.

Haptic technology refers to technology which interfaces to the user via the sense of touch by applying forces, vibrations and/or motions to the user. This mechanical stimulation may be used to assist in the creation of virtual objects (e.g., objects existing in a computing environment), for control of such virtual objects, and to enhance the control of machines and devices (e.g., mobile terminals). For example, haptic technology makes it possible to investigate in detail how the human sense of touch works, by allowing the creation of carefully-controlled haptic virtual objects. These objects may be used to systematically probe human haptic capabilities.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images. As described above, if the display module 151 and the user input unit 130 form a mutual layer structure and are thus implemented as a touch screen, the display module 151 may be used not only as an output device but also as an input device. The display module 151 may include at least one of a liquid crystal display (LCD), a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. The alarm module 155 may output a signal upon receiving a call signal or a message. In addition, the alarm module 155 may receive a key signal and may output a signal as feedback to the key signal. Once a signal is output by the alarm unit, the user may recognize that an event has occurred. A signal for notifying the user of the occurrence of an event may be output by the display module 151 or the audio output module 153.

The haptic module 157 may provide various haptic effects (such as vibrations) that can be perceived by the user. If the haptic module 157 generates vibration as a haptic effect, the intensity and the pattern of vibration generated by the haptic module 157 may be altered in various manners. The haptic module 157 may synthesize different vibration effects and may output the result of the synthesization. Alternatively, the haptic module 157 may sequentially output different vibration effects.

The haptic module 157 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may be configured to enable the user to recognize a haptic effect using the kinesthetic sense of the fingers or the arms. The mobile terminal 100 may include two or more haptic modules 157.

The memory 160 may store various programs necessary for the operation of the controller 180. In addition, the memory 160 may temporarily store various data such as a phonebook, messages, still images, or moving images. The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the Internet.

The interface unit 170 may interface with an external device that can be connected to the mobile terminal 100. The interface unit 170 may be a wired/wireless headset, an external battery charger, a wired/wireless data port, a card socket for, for example, a memory card) or a subscriber identification module (SIM)/user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

If the mobile terminal 100 is connected to an external cradle, power may be supplied from the external cradle to the mobile terminal through the interface unit 170, and various command signals may be transmitted from the external cradle to the mobile terminal through the interface unit 170. The controller 180 may control the general operation of the mobile terminal 100. For example, the controller 180 may perform various control operations regarding making/receiving a voice call, transmitting/receiving data, or making/receiving a video call. The controller 180 may include a multimedia play module 181, which plays multimedia data. The multimedia play module 181 may be implemented as a hardware device and may be installed in the controller 180. Alternatively, the multimedia play module 181 may be implemented as a software program.

The power supply unit 190 is supplied with power by an external power source or an internal power source and supplies power to other components in the mobile terminal 100. The mobile terminal 100 may include a wired/wireless communication system and a satellite-based communication system. The mobile terminal 100 may be configured to be able to operate in a communication system transmitting data as frames or packets. The exterior of the mobile terminal 100 will hereinafter be described in detail with reference to FIGS. 2 and 3. For convenience, assume that the mobile terminal 100 is a slider-type mobile phone. However, the present invention is not restricted to a slider-type mobile phone. Rather, the present invention can be applied to various mobile phones, other than a slider-type mobile phone.

Figure 2:
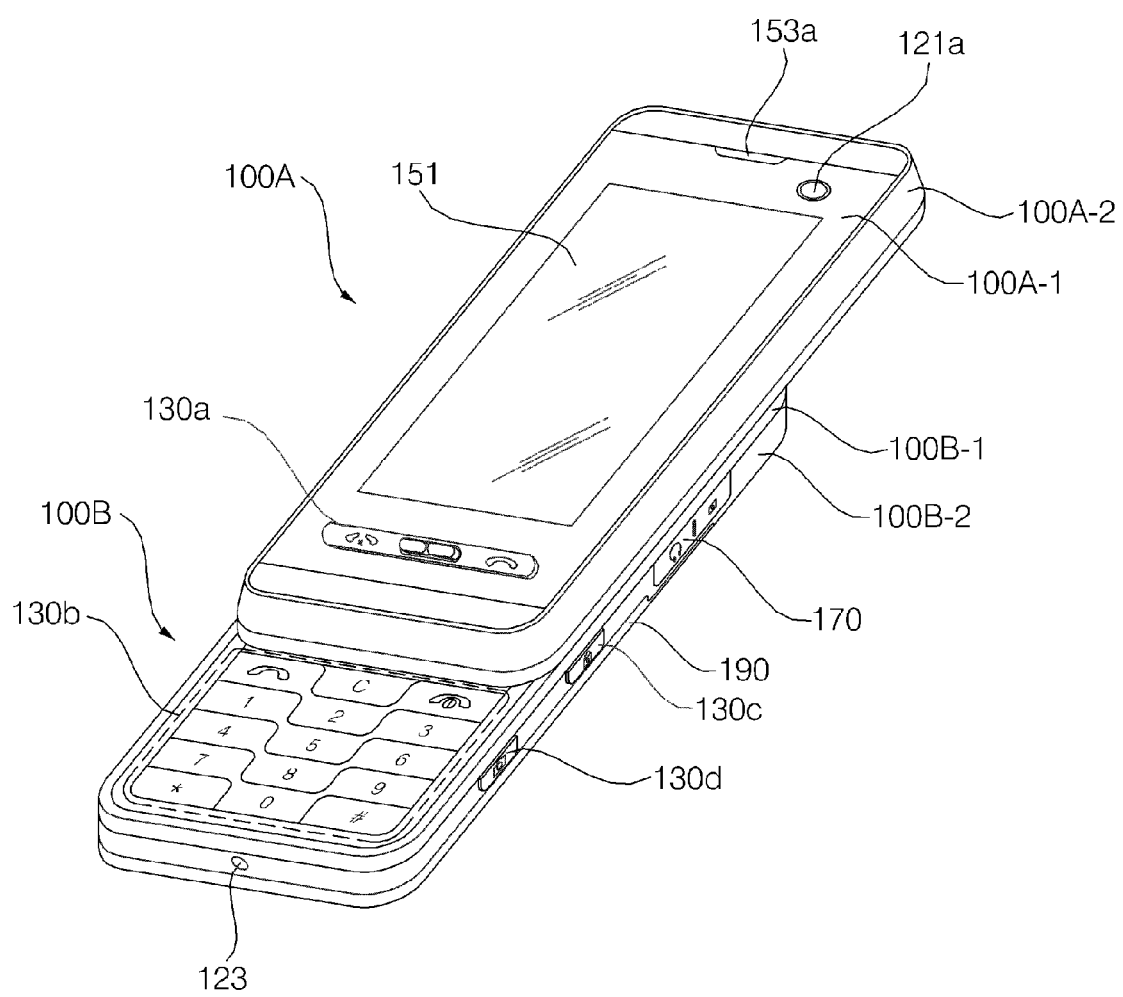
FIG. 2 illustrates a front perspective view of the mobile terminal shown in FIG. 1.

FIG. 2 illustrates a front perspective view of the mobile terminal 100 shown in FIG. 1. Referring to FIG. 2, the mobile terminal 100 includes a first body 100a and a second body 100b configured to be able to slide in at least one direction along the first body 100A. When the first body 100A overlaps the second body 100B, the mobile terminal 100 is determined to be closed. When the first body 100A exposes at least part of the second body 100B, the mobile terminal 100 is determined to be opened up. When the mobile terminal 100 is closed, the mobile terminal 100 generally operates in a standby mode, and may be manually released from the standby mode by a user. When the mobile terminal 100 is opened up, the mobile terminal 100 generally operates in a call mode, and may be placed in a standby mode either manually by a user or automatically after the lapse of a predetermined amount of time.

The first body 100A may include a first front case 100A-1 and a first rear case 100A-2, which form the exterior of the first body 100A. Various electronic products may be installed in the empty space between the first front case 100A-1 and the first rear case 100A-2. At least one intermediate case may be additionally disposed between the first front case 100A-1 and the first rear case 100A-2. The first front case 100A-1 and the first rear case 100A-2 may be formed of a synthetic resin through injection molding. Alternatively, the first front case 100A-1 and the first rear case 100A-2 may be formed of a metal such as stainless steel (STS) or titanium (Ti). The display module 151, a first audio output module 153a, a first camera 121a and a first user input module 130a may be disposed in the first body 100A, and particularly, in the first front case 100A-1.

The display module 151 may include an LCD or an OLED, which visually represents information. Since a touch pad is configured to overlap the display module 151 and thus to realize a layer structure, the display module 151 may serve as a touch screen. Thus, it is possible for a user to input information to the display module 151 simply by touching the display module 151. The first audio output module 153a may be implemented as a receiver or a speaker. The first camera 121a may be configured to capture a still image or a moving image of a user. The second body 100B may include a second front case 100B-1 and a second rear case 100B-2, which form the exterior of the second body 100B.

A second user input module 130b may be disposed at the front of the second body 100B, and particularly, at the front of the second front case 100B-1. Third and fourth user input modules 130c and 130d, the microphone 123 and the interface unit 170 may be disposed in the second front case 100B-1 or the second rear case 100B-2. The first through fourth user input modules 130a through 130d may be collectively referred to as the user input unit 130. The user input unit 130 may adopt various manipulation methods as long as it can offer tactile feedback to a user. For example, the user input unit 130 may be implemented as a dome switch or a touch pad which receives a command or information upon being pushed or touched by a user. Alternatively, the user input unit 130 may be implemented as a wheel, a jog dial, or a joystick.

The first user input module 130a may allow a user to input such commands as 'start', 'end', and 'scroll'. The second user input module 130b may allow a user to input numbers, characters or symbols. The third and fourth user input modules 130c and 130d may serve as hot keys for activating certain functions of the mobile terminal 100. The microphone 123 may be configured to be able to receive the voice of a user or other sounds. The interface unit 170 may serve as a path for allowing the mobile terminal 100 to exchange data with an external device. For example, the interface unit 170 may be a connection terminal for connecting an earphone to the mobile terminal 100 in a wired or wireless manner, a port for short-range communication or a power supply terminal for supplying power to the mobile terminal 100.

Figure 3:
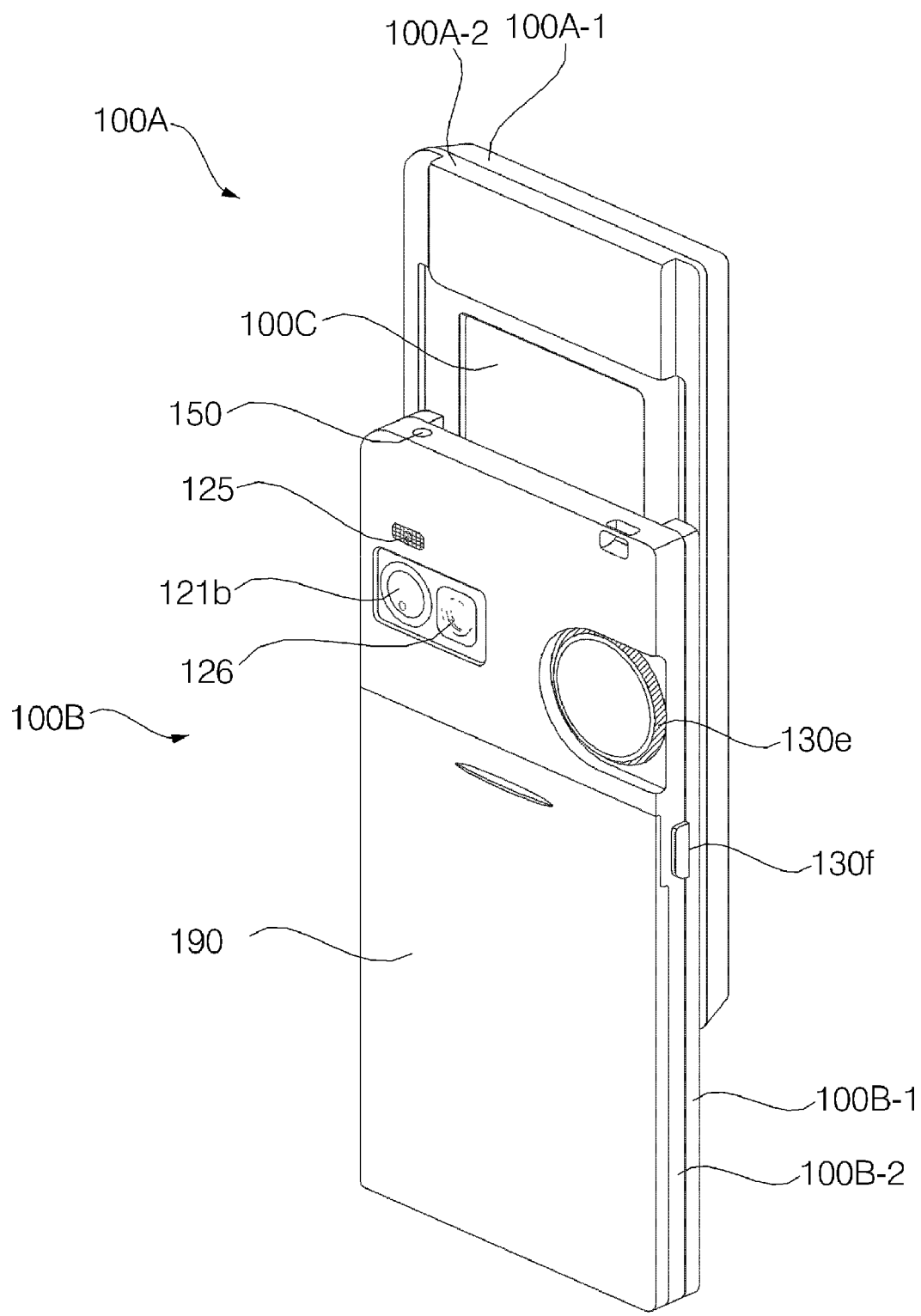
FIG. 3 illustrates a rear perspective view of the mobile terminal shown in FIG. 1.

The interface unit 170 may be a SIM or a UIM or may be a card socket for an exterior-type card such as a memory card for storing data. The power supply unit 190 may be inserted in the second rear case 100B-2. The power supply unit 190 may be a rechargeable battery and may be coupled to the second body 100B so as to be able to be attached to or detached from the second body 100B. FIG. 3 illustrates a rear perspective view of the mobile terminal 100 shown in FIG. 2. Referring to FIG. 3, a fifth user input module 130e and a second camera 121b may be disposed at the rear of the second rear case 100B-2 of the second body 100B. The fifth user input module 130e may be of a wheel type. In addition, a sixth user input module 130f may be disposed on a lateral side of the second body 100B. The second camera 121b may have a different photographing direction from that of the first camera 121a shown in FIG. 2. In addition, the number of pixels of the second camera 121b may be different from the number of pixels of the first camera 121a.

For example, the first camera 121a may be used to capture an image of the face of a user and then readily transmit the captured image during a video call. Thus, a low-pixel camera module may be used as the first camera 121a. The second camera 121b may be used to capture an image of an ordinary subject. Given that images captured by the second camera 121b generally do not need to be transmitted, a high-pixel camera module may be used as the second camera 121b. A camera flash 125 and a mirror 126 may be disposed near the second camera 121b. The camera flash 125 illuminates a subject when the second camera 121b captures an image of the subject. The user may look in the mirror 126 for taking a self shot. A second sound output module (not shown) may be additionally provided in the second rear case 100B-2. The second sound output module may realize a stereo function along with the first audio output module 153a. The second sound output module may also be used during a speakerphone mode.

An antenna (not shown) for receiving a broadcast signal may be disposed on one side of the second rear case 100B-2. The antenna may be installed so as to be able to be pulled out from the second body 100B-2. A slider module 100C may be disposed on the first rear case 100A-2 of the first body 100A.

The slider module 100C may couple the first body 100A and the second body 100B so that the first body 100A can slide along the second body 100B. The slider module 100C may be partially exposed by the second front case 100B-1. The second camera 121b is illustrated in FIG. 3 as being disposed on the second body 100B, but the present invention is not restricted to this.

For example, at least one of the antenna, the second camera 121b and the camera flash 125 may be mounted on the first body 100A, and particularly, the first rear case 100A-2 of the first body 100A. In this case, whichever of the antenna, the second camera 121b and the camera flash 125 is mounted on the first rear case 100A-2 may be protected by the second body 100B when the mobile terminal 100 is closed. The first camera 121a may be able to rotate and thus to cover the photographing direction of the second camera 121a. In this case, the second camera 121b may be optional.

Figure 4:
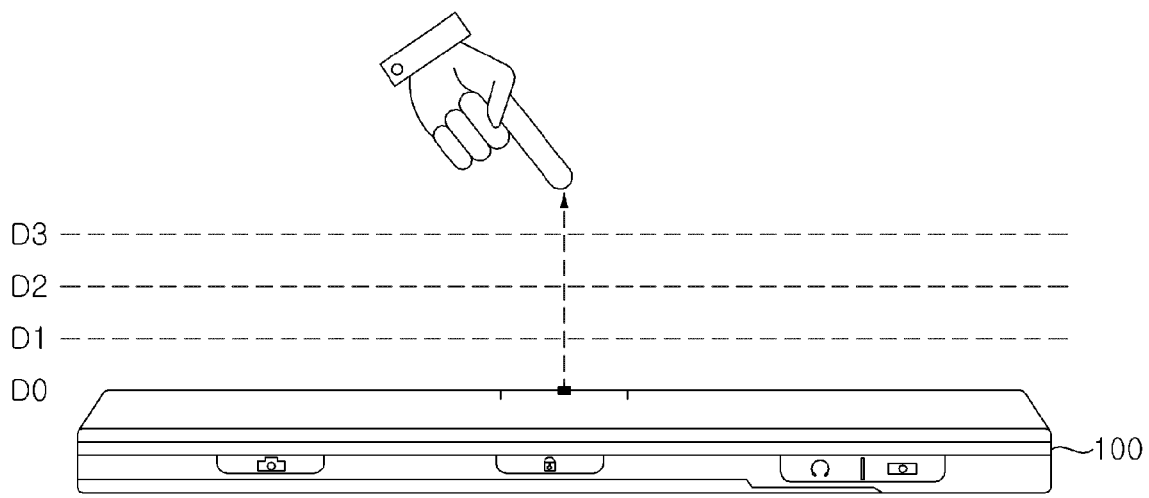
FIG. 4 illustrates a diagram for explaining the operation of a proximity sensor in accordance with one embodiment.

FIG. 4 illustrates a diagram for explaining the operation of the proximity sensor 141 shown in FIG. 1. Referring to FIG. 4, if an entity, for example, a user's finger, is nearby and approaching the display module 151, the proximity sensor 141 may detect the user's finger and may output a proximity signal. The proximity sensor 141 may output different proximity signals according to the distance to the user's finger. For example, a proximity signal output by the proximity sensor 141 when the user's finger is located at position D3 may be different from a proximity signal output by the proximity sensor 141 when the user's finger is located at position D2 or D1. More than one proximity sensor 141 having different detection ranges may be provided. In this case, it is possible to determine how close the user's finger is to the mobile terminal 100 by comparing a plurality of proximity signals respectively output by the proximity sensors 141.

Alternatively, more than one proximity sensor 141 may be disposed in different regions in the display module 151. In this case, it is possible to determine which part of the display module 151 is touched or approached by the user's finger and/or whether the user's finger moves within a close range of the display module 151 by determining which of the proximity sensor 141 outputs a proximity sensor. Therefore, the controller 180 may perform various operation control operations according to the degree to which the user's finger is close to the display module 151 and the position on the display module 151 touched or approached by the user's finger.

Figure 5A:
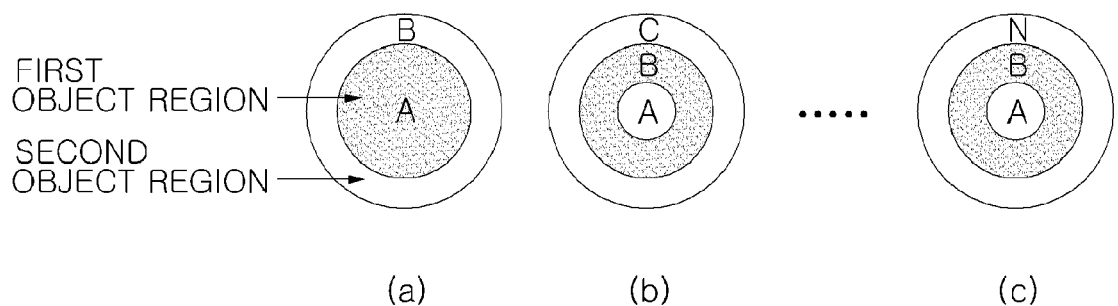
FIG. 5A through 5D illustrate diagrams for explaining a proximity region and a haptic region in accordance with one embodiment.
Figure 5B:
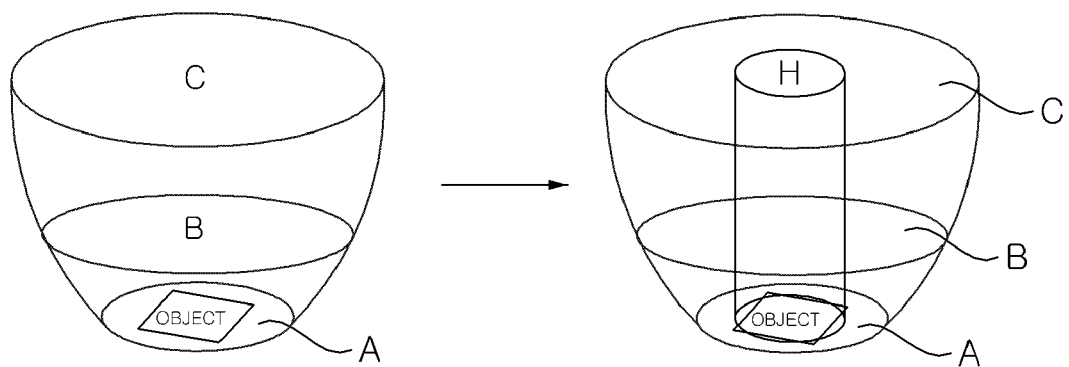

FIGS. 5A through 5D illustrate diagrams for explaining a proximity region from which a proximity signal is output and a haptic region for which a haptic effect is generated. Referring to FIG. 5A(a), if an object such as an icon or a menu item is displayed on the screen of the display module 151, the object may be divided into a first object region A, which accounts for a central portion of the object, and a second object region B, which accounts for a boundary portion of the object and surrounds the first object region A, and different haptic effects having different intensities or different patterns may be generated for the first and second object regions A and B. For example, the intensity of vibration generated when the first object region A is touched may be higher than the intensity of vibration generated when the second object region B is touched.

In addition, a proximity region and a haptic region may both be set in an object. In this case, the area of the proximity region may be different from the area of the haptic region. That is, the area of the haptic region may be less than the area of the proximity region or vice versa. For example, referring to FIG. 5A(a), the whole object may be designated as a proximity region, and only the first object region A may be designated as a haptic region. Alternatively, the object may be divided into three object regions, i.e., first, second and third object regions A, B and C, as illustrated in FIG. 5A(b). Further, the object may be divided into N object regions, as illustrated in FIG. 5A(c), and the haptic module 157 may be configured to generate different types of haptic effects for the N object regions. Even in the case when the object is divided into three or more object regions, a haptic region and a proximity region may occupy different areas in the object.

The area of a proximity region may vary according to the degree of proximity between the display module 151 and an entity that is nearby and approaching the display module 151. That is, referring to FIG. 5B(a), the area of a proximity region may gradually decrease from C to B and from B to A according to the degree of proximity between the display module 151 and the entity. Alternatively, the area of a proximity region may gradually increase according to the degree of proximity between the display module 151 and the entity. However, the area of a haptic region may be uniformly maintained regardless of the distance from the display module 151, as indicated by reference character H of FIG. 5A(b).

Figure 5C:
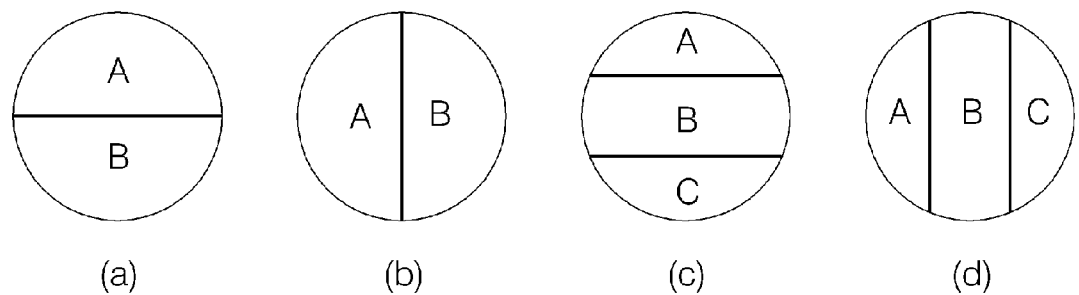
Figure 5D:
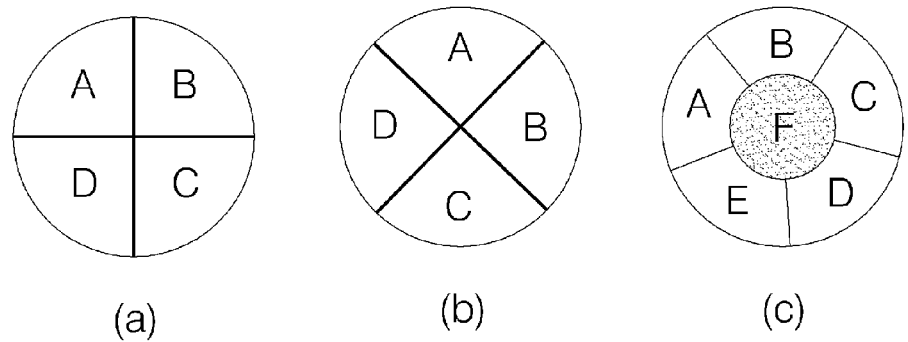

An object may be divided into a number of concentric object regions, as illustrated in FIG. 5A. Alternatively, an object may be divided into various manners, other than the concentric manner. For example, an object may be divided into a number of juxtaposed object regions formed in striped or fan-shaped object regions or a combination thereof, as illustrated in FIGS. 5C and 5D. Once an object is divided into a number of object regions, different haptic effects having different intensities or different patterns may be generated for the object regions, or a proximity signal may be generated for each of the object regions.

Figure 6:
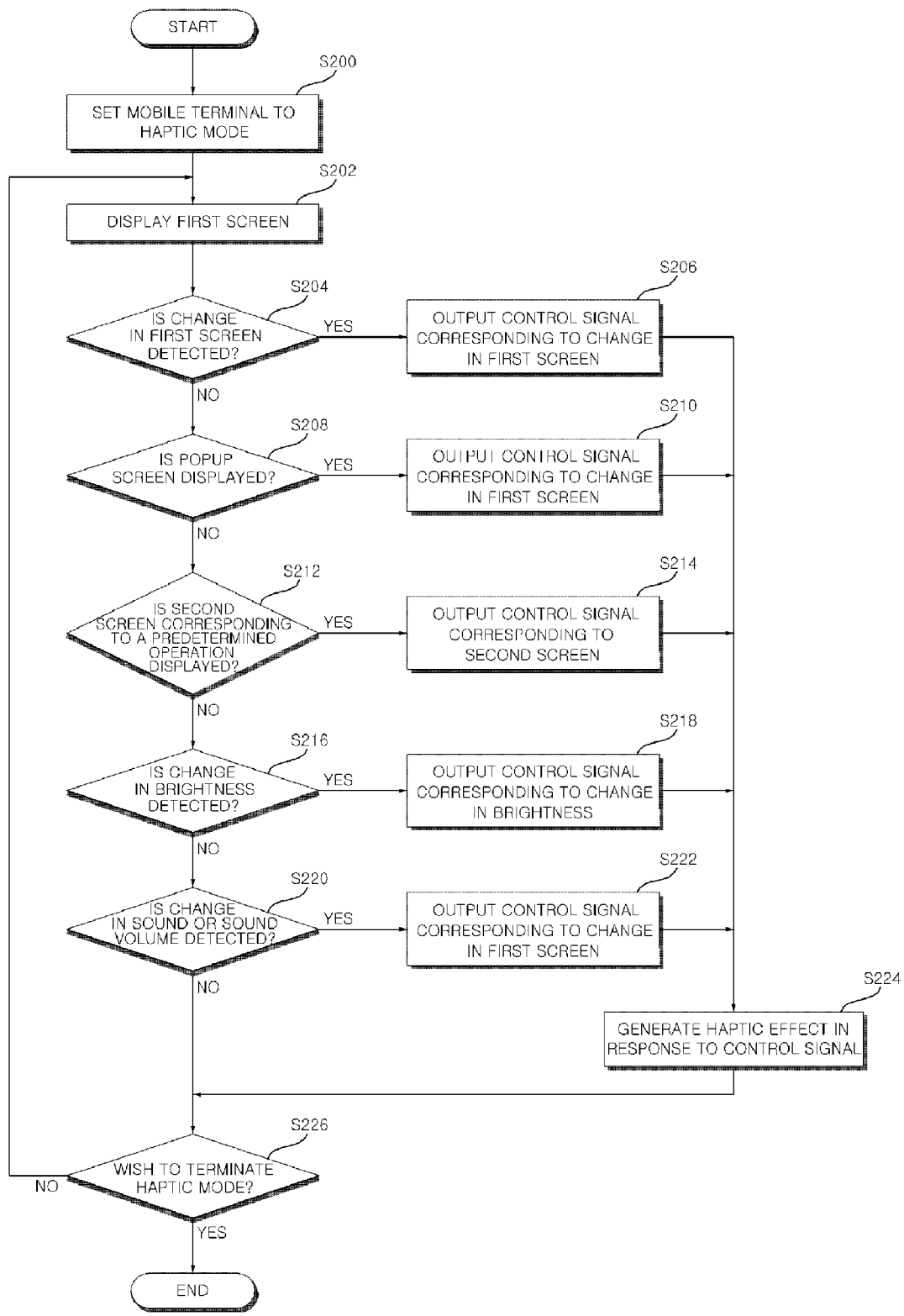
FIG. 6 illustrates a flowchart of a method of controlling a mobile terminal in accordance with one embodiment.

FIG. 6 illustrates a flowchart of a method of controlling a mobile terminal according to an exemplary embodiment of the present invention. Referring to FIG. 6, the mobile terminal 100 may be placed in a haptic mode (such as a vibration output mode) in response to a user command (S200). The mobile terminal 100 may be placed in the haptic mode through default setting or user setting. In addition, an additional menu for placing the mobile terminal 100 in or releasing the mobile terminal 100 from the haptic mode may be provided.

Thereafter, the controller 180 may display a first screen corresponding to a menu or operation chosen by a user on the screen of the display module 151 (S202). Thereafter, the controller 180 may determine whether the first screen has changed (S204). If a change in the first screen is detected, the controller 180 may output a control signal corresponding to the change in the first screen (S206). The control signal output by the controller 180 may be a signal for controlling the haptic module 157 to generate a haptic effect corresponding to the change in the first screen.

The first screen may vary in accordance with a change in the operating state of the mobile terminal 100. Examples of the change in the first screen include the appearance of a new icon on the first screen or the disappearance of an existing icon from the first screen, a change in the shape of an icon displayed on the first screen, a change in the scale of the first screen, the rotation of the first screen, and a change in the shape of an image displayed on the first screen. The control signal output by the controller 180 may be transmitted to the haptic module 157. The haptic module 157 may generate a haptic effect corresponding to the control signal output by the controller 180 (S224).

If a popup window is displayed on the first screen (S208), the controller 180 may output a control signal corresponding to the popup screen (S210), and the haptic module 157 may generate a haptic effect corresponding to the display of the popup window in response to the control signal (S224). If the display module 151 displays a second screen corresponding to a predetermined operation, instead of the first screen, under the control of the controller 180 (S212), the controller 180 may output a control signal corresponding to the second screen (S214), and the haptic module 157 may generate a haptic effect corresponding to the display of the second screen under the control of the controller 180 (S224).

If a change in the brightness of a screen currently being displayed by the display module 151 is detected (S216), the controller 180 may output a control signal corresponding to the change in the brightness of the screen (S218), and the haptic module 157 may generate a haptic effect corresponding to the change in the brightness of the screen under the control of the controller 180 (S224). If a change in sound or sound volume is detected (S220), the controller 180 may output a control signal corresponding to the sound change or the sound volume change (S222), and the haptic module 157 may generate a haptic effect corresponding to the sound change or the sound volume change under the control of the controller 180. The haptic module 157 may also generate a haptic effect according to a brightness value or a sound volume value set using a menu for setting brightness or sound volume.

For example, as the brightness of the screen currently being displayed by the display module 151 increases, the intensity of vibration generated by the haptic module 157 may gradually increase. On the other hand, as the brightness of the screen currently being displayed by the display module 151 decreases, the intensity of vibration generated by the haptic module 157 may gradually decrease. The haptic module 157 may be configured to generate a haptic effect upon detecting a change in the operating state of the mobile terminal 100.

Operations S204 through S224 may be repeatedly performed until the mobile terminal 100 is released from the haptic mode (S226). In this exemplary embodiment, it is possible to generate different haptic effects for different types of changes in the operating state of the mobile terminal 100 such as changes in a screen or changes in a popup screen. Thus, it is possible for the user to recognize changes in the operating state of the mobile terminal 100 using the sense of touch.

Figure 7:
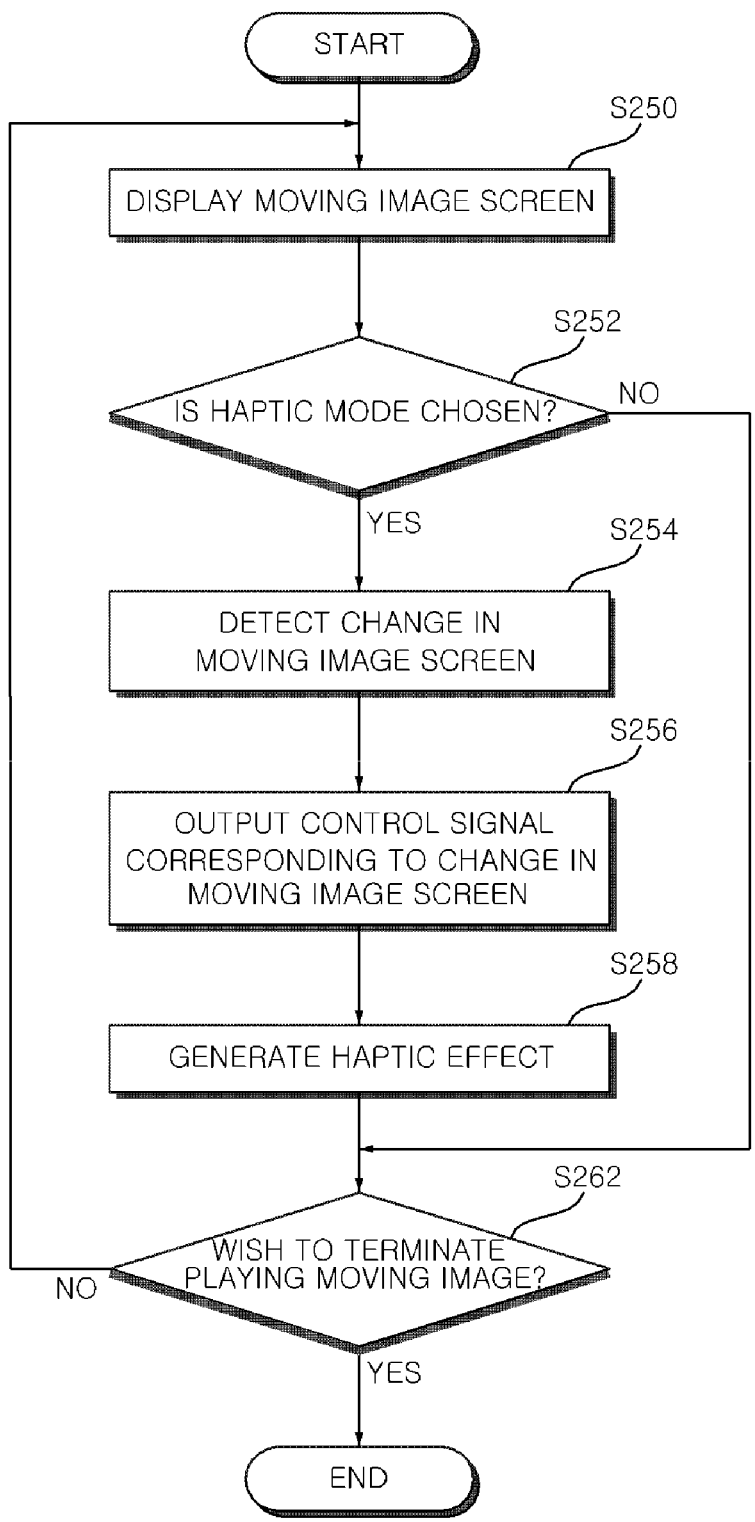
FIG. 7 illustrates a flowchart of a method of controlling a mobile terminal according to another exemplary embodiment.

FIG. 7 illustrates a flowchart of a method of controlling a mobile terminal according to another exemplary embodiment. The generation of a tactile effect upon detecting a variation in a moving image screen will hereinafter be described in detail with reference to FIG. 7. Referring to FIG. 7, if a menu for playing a multimedia file is called in response to a user command and a moving image file to be played is chosen, the controller 180 may display a moving image screen for playing the chosen moving image file on the screen of the display module 151 (S250). If a haptic mode is chosen (S252), the controller 180 may detect a change in the moving image screen (S254). Examples of the change in the moving image screen include a considerable change of the moving image screen between previous and current frames and a considerable change of a predetermined object in the moving image screen between the previous and current frames. A user may determine the type of change in the moving image screen that the haptic module 157 should respond to.

The controller 180 may output a control signal corresponding to the change in the moving image screen (S256). Then, the haptic module 157 may generate a haptic effect corresponding to the change in the moving image screen in response to the control signal output by the controller 180 (S260). Operations S250 through S260 may be repeatedly performed until the play of the chosen moving image file is terminated (S262). In this manner, it is possible to generate various haptic effects upon detecting a change in a moving image screen by placing the mobile terminal 100 in the haptic mode during the play of a moving image file.

Figure 8:
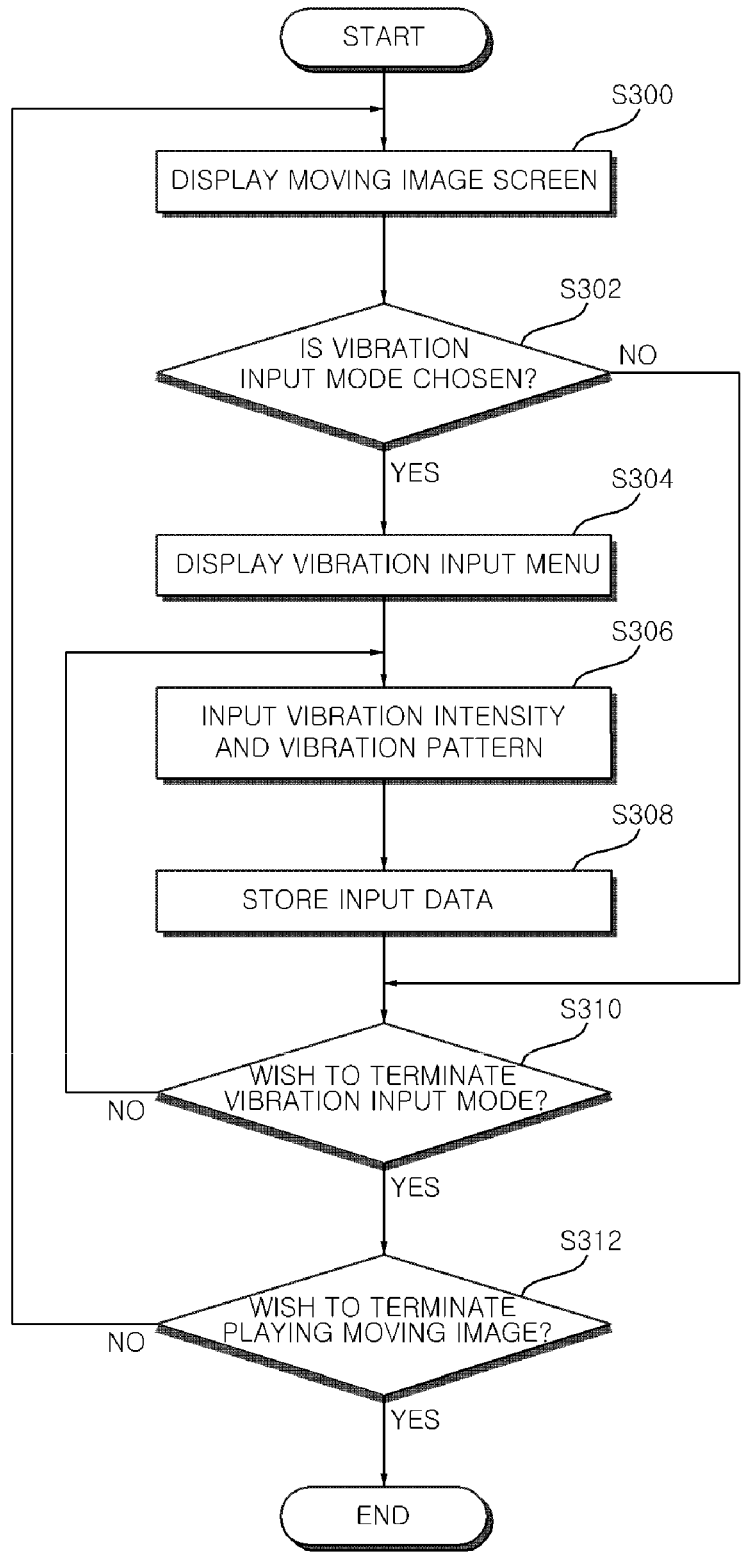
FIG. 8 illustrates a flowchart of a method of controlling a mobile terminal according to another exemplary embodiment.

FIG. 8 illustrates a flowchart of a method of controlling a mobile terminal according to another exemplary embodiment. The generation of a haptic effect desired by a user for a moving image screen will hereinafter be described in detail with reference to FIG. 8.

Referring to FIG. 8, if a menu for playing a multimedia file is called in response to a user command and a moving image file to be played is chosen, the controller 180 may display a moving image screen for playing the chosen moving image file on a touch screen, i.e., the screen of the display module 151 (S300). If a vibration input mode is chosen in response to a touch input (S302), the controller 180 may display a vibration input menu for inputting a vibration signal on the screen of the display module 151 (S304). If vibration data such as the intensity and the pattern of vibration for the moving image screen is received from the vibration input menu (S306), the controller 180 may link the vibration data to the chosen moving image file and may store the vibration data linked to the chosen moving image file (S308). The controller 180 may also store synchronization data for synchronizing the vibration data with the chosen moving image file.

Operations S300 through S308 may be repeatedly performed until the mobile terminal 100 is released from the vibration input mode (S310). If the mobile terminal 100 is released from the vibration input mode, the controller 180 may determine whether a user wishes to terminate the play of a moving image file (S312). If the user wishes not to terminate the play of a moving image file, the method returns to operation S300. In this exemplary embodiment, vibration data may be stored in advance in connection with a moving image file chosen by the user. Thus, during the play of the moving image file, vibration may be generated according to the vibration data. In this exemplary embodiment, vibration may be generated as a haptic effect. However, the present invention is not restricted to this. That is, various haptic effects, other than vibration, may be generated during the play of a moving image file.

Figure 9:
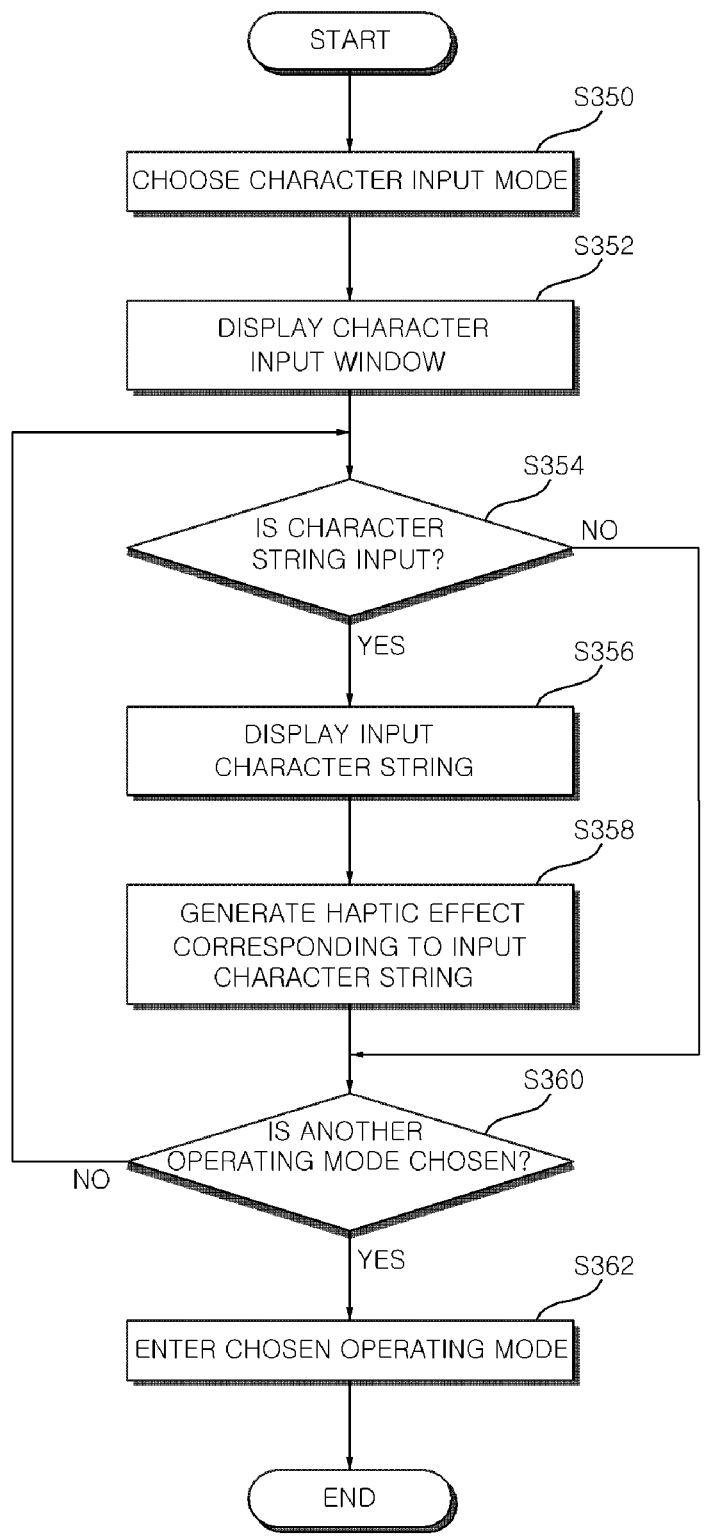
FIG. 9 illustrates a flowchart of a method of controlling a mobile terminal according to another exemplary embodiment.

FIG. 9 illustrates a flowchart of a method of controlling a mobile terminal according to another exemplary embodiment. The generation of a haptic effect (particularly, a vibration effect) in response to the input of a touch key will hereinafter be described in detail with reference to FIG. 9. Referring to FIG. 9, if a character input mode for making a call, sending a message, or searching for a phone number or a file is chosen in response to a user command (S350), the controller 180 may display a character input window on a touch screen, i.e., the screen of the display module 151 (S352). Thereafter, the controller 180 may determine whether a character string has been input to the character input window through touch input (S354). If a character string has been input to the character input window, the controller 180 may display the input character string in a predetermined area on the screen of the display module 151 (S356). However, the controller 180 may perform an operation, other than displaying the input character string on the screen of the display module 151, according to the type of menu.

The controller 180 may analyze the input character string and may output a control signal corresponding to the input character string based on the results of the analysis. Then, the haptic module 157 may generate a haptic effect corresponding to the input character string under the control of the controller 180 (S358). That is, the haptic module 157 may output various types of vibrations according to the configuration of each character in the input character string. A user may determine in advance the intensity and pattern of vibration to be output for the input character string. If an operating mode, other than the character input mode, is chosen (S360), the controller 180 may control the mobile terminal 100 to be placed in the operating mode (S362). If no other operating mode is chosen, the method returns to operation S354.

In this manner, various types of vibrations may be output according to the configuration of each character in the input character string. Thus, the user may easily identify the input character string based on the intensity and the pattern of vibration output by the haptic module 157. For this, the input character string may be divided into three constituents, i.e., an initial consonant, a medial vowel and a final consonant, and three types of vibrations respectively corresponding to the three constituents may be output according to the configuration of the input character string.

If the input character string is '홍길동', a first vibration corresponding to initial consonants 'ㅎ', 'ㄱ', and 'ㄷ' in the input character string, a second vibration corresponding to medial vowels 'ㅗ' and 'ㅣ' in the input character string and a third vibration corresponding to final consonants 'ㅇ' and 'ㄹ' in the input character string may be sequentially output according to the configuration of the input character string. Alternatively, the first, second and third vibrations may be synthesized, and the result of the synthesization may be output according to the configuration of the input character string.

Alternatively, the input character string may be divided into two constituents, i.e., one or more vowel and one or more consonant, and two types of vibrations respectively corresponding to the two constituents may be output according to the configuration of the input character string. For example, if the input character string is '사랑', a fourth vibration corresponding to consonants 'ㅅ', 'ㄹ', and 'ㅇ' in the input character string and a fifth vibration corresponding to a vowel 'ㅏ' in the input character string may be sequentially output according to the configuration of the input character string. Alternatively, the fourth and fifth vibrations may be synthesized, and the result of the synthesization may be output according to the configuration of the input character string.

In one embodiment, different types of vibrations may be output for different syllables, different morphemes, for different parts of speech, or for different words. If the input character string includes one or more numerals, a vibration corresponding to each of the numerals may also be output. If the input character string includes an emoticon such as '^^', a frequently-used phrase such as 'I am in conference now', or a special character such as '☆' or '♡', a vibration corresponding to the emoticon, the frequently-used phrase, or the special character may also be output. In addition, different types of vibrations may be output for different types of character input modes such as a Korean input mode, an English input mode, a numeral input mode, a key pad input mode and an italic input mode. In this exemplary embodiment, vibration is provided as a haptic effect. However, the present invention is not restricted to this. That is, the present invention can be applied to various haptic effects, other than vibration.

Figure 10:
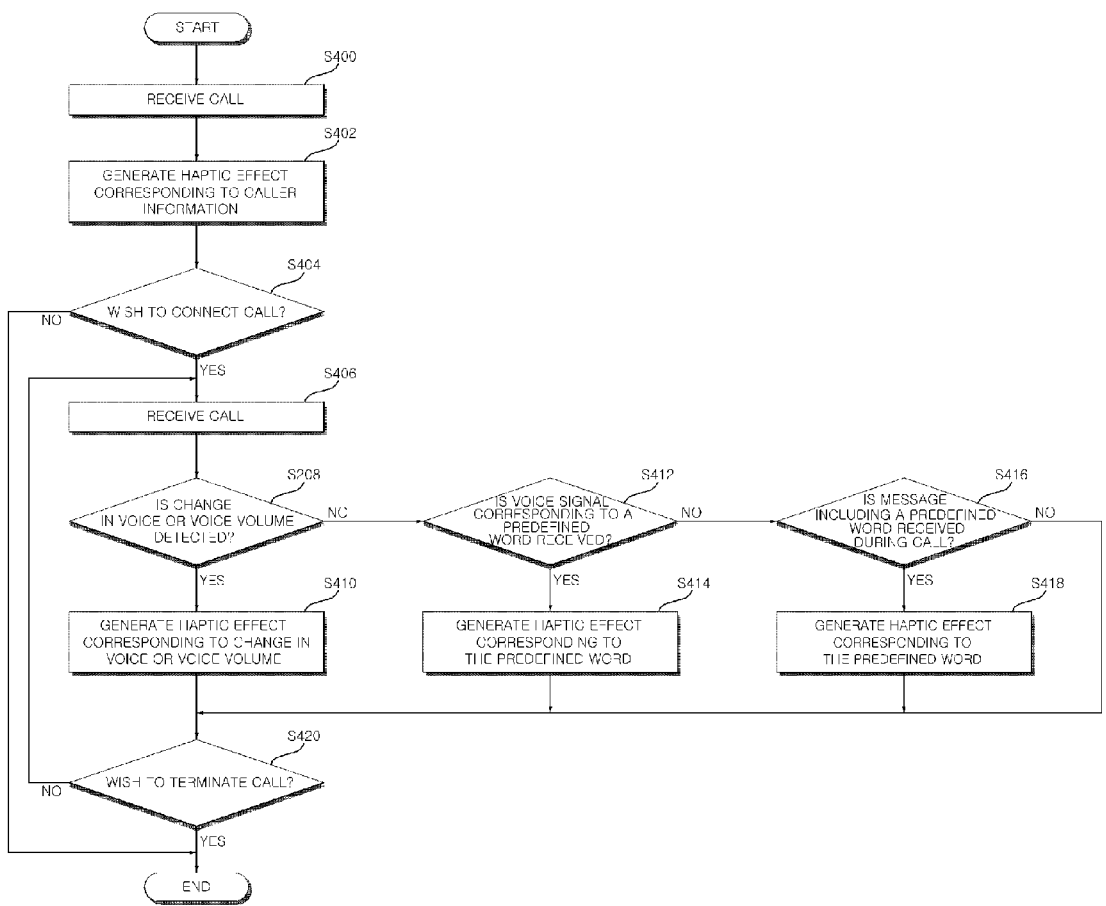
FIG. 10 illustrates a flowchart of a method of controlling a mobile terminal according to another exemplary embodiment.

FIG. 10 illustrates a flowchart of a method of controlling a mobile terminal according to another exemplary embodiment. Referring to FIG. 10, if a call such as a voice call or a video call is received (S400), the controller 180 may display caller information on the screen of the display module 151 and may control the haptic module 157 to analyze the caller information and thus to generate a haptic effect such as vibration based on the results of the analysis (S402). Thereafter, if a user chooses to connect the call, the controller 180 may control the call to be performed (S408). If a variation in the voice or the voice volume of a caller or a callee is detected, the controller 180 may control the haptic module 157 to generate a haptic effect corresponding to the detected voice or voice volume variation (S410). If a voice signal corresponding to a predefined word is received during a call with the caller or the callee (S412), the controller 180 may control the haptic module 157 to generate a haptic effect corresponding to the predefined word (S414).

If a message including a predetermined word is received during the call with the caller or the callee (S416), the controller 180 may also control the haptic module 157 to generate a haptic effect corresponding to the predetermined word (S418). If another call is requested during the call with the caller or the callee, the controller 180 may control the haptic module 157 to analyze caller information and thus to generate a haptic effect corresponding to the requested call. In addition, if a predefined event occurs during the call with the caller or the callee, the controller 180 may control the haptic module 157 to generate a haptic effect corresponding to the predefined event. Operations S404 through S418 may be repeatedly performed until the user chooses to terminate the call (S420). In this manner, it is possible for the user to easily identify an event that occurs during the call with the caller or the callee by using the sense of touch.

Figure 11:
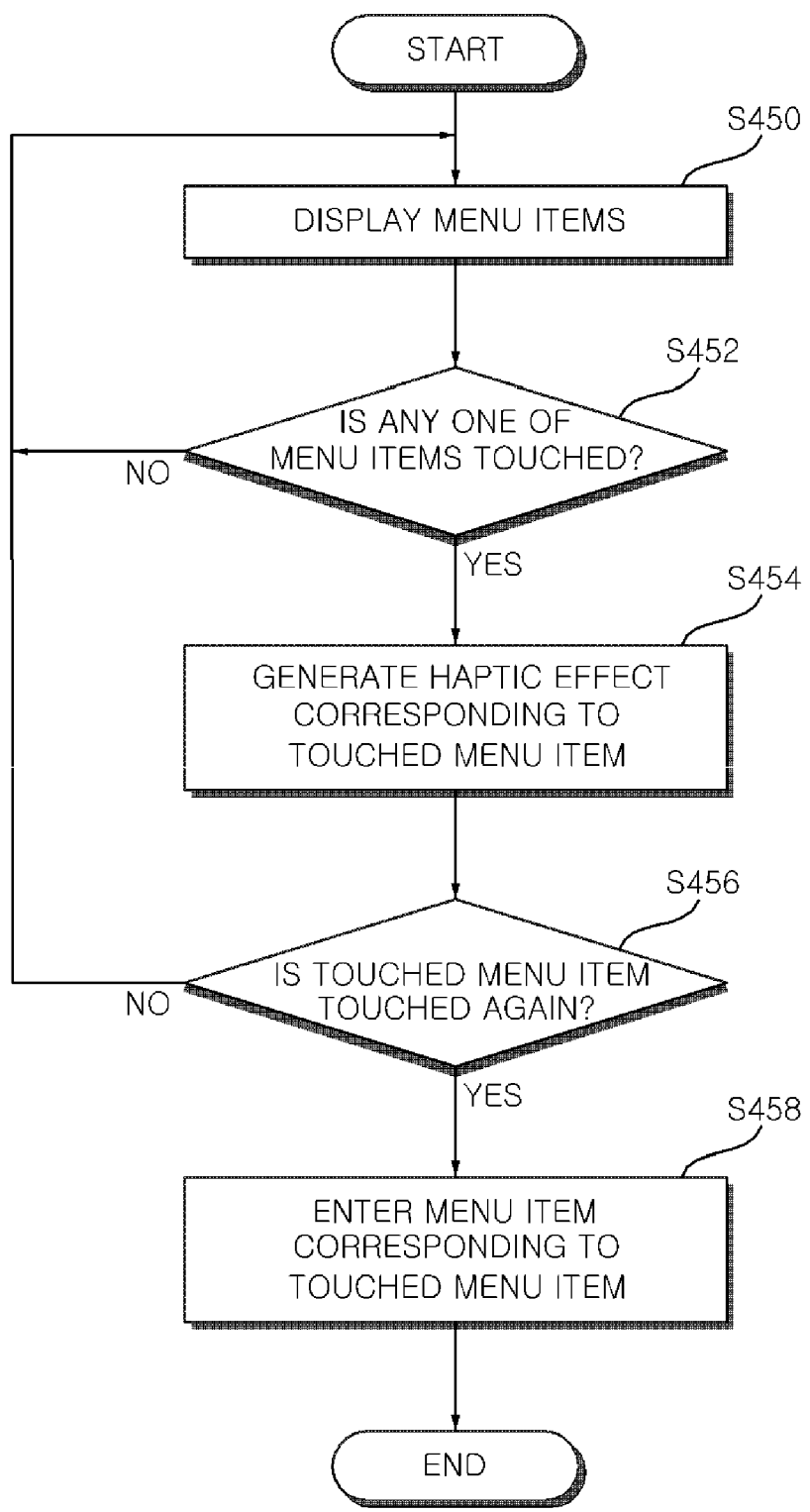
FIG. 11 illustrates a flowchart of a method of controlling a mobile terminal according to another exemplary embodiment.
Figure 13:
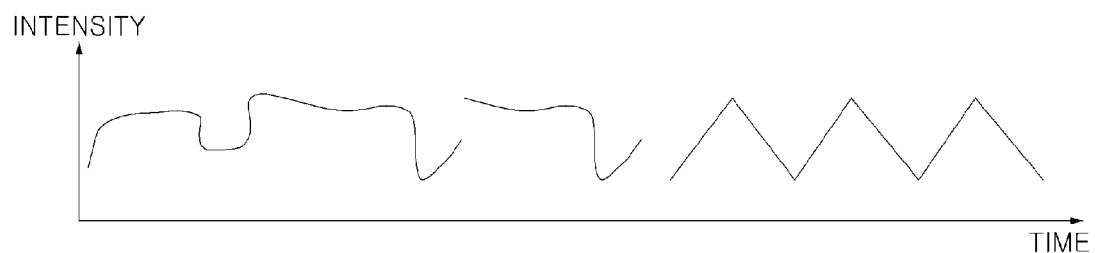

FIG. 11 illustrates a flowchart of a method of controlling a mobile terminal according to another exemplary embodiment. Referring to FIG. 11, if a menu is chosen, the controller 180 may display a number of menu items of the chosen menu on the screen of the display module 151, e.g., on a touch screen (S450). If one of the menu items is touched and thus chosen by a user (S452), the controller 180 may control the haptic module 157 to generate a haptic effect corresponding to the chosen menu item (S454). If one of the menu items is approached by, for example, the user's finger, the controller 180 may also control the haptic module 157 to generate a haptic effect corresponding to the approached menu item.

If the chosen menu item is touched again, the controller 180 may enter a menu corresponding to the chosen menu item (S458). On the other hand, if a menu item other than the chosen menu item is touched, the controller 180 may control the haptic module 157 to generate a haptic effect corresponding to the touched menu item. Alternatively, if any one of the menu items is touched for longer than a predefined amount of time, the controller 180 may enter a menu corresponding to the touched menu item. In this manner, it is possible to generate different haptic effects for different menu items. Thus, it is possible for a user to easily determine which of the menu items has been touched or approached by using the sense of touch.

FIGS. 12 through 41 illustrate diagrams for explaining the methods shown in FIGS. 6 through 11. For convenience, assume that the mobile terminal 100 generates vibration as a haptic effect. However, the present invention is not restricted to this. That is, the mobile terminal 100 may generate various haptic effects, other than vibration. FIGS. 12 through 21 illustrate diagrams for explaining how to generate a haptic effect in accordance with a change in a screen image displayed by the display module 151. More specifically, FIG. 12 illustrates diagrams for explaining how to generate a haptic effect in accordance with a change in an indicator region in which a plurality of indicator icons are displayed.

Referring to FIG. 12(a), a plurality of indicator icons indicating received signal strength, remaining battery power, current time information and various states of the mobile terminal 100 such as whether the mobile terminal 100 is receiving or making a voice call, whether an alarm function or a morning call function is set, and whether there are unchecked new messages may be displayed. The indicator icons may appear on or disappear from the screen of the display module 151 according to the settings or the operating state of the mobile terminal 100. A haptic effect may be generated in accordance with a change in an indicator region in which the indicator icons are displayed.

For example, a haptic effect may be generated in accordance with the lapse of time, as illustrated in FIGS. 12(b) and 12(c), or in accordance with a change in a level bar indicating remaining battery power, as illustrated in FIGS. 12(d) and 12(e). In addition, a haptic effect may be generated whenever a new indicator icon appears in an indicator region or whenever an existing indicator icon disappears from the indicator region, as illustrated in FIGS. 12(f) through 12(h). It is necessary sometimes to output a plurality of vibration effects or a plurality of non-vibration haptic effects according to the type or the state of an indicator icon. For this, referring to FIG. 13, the vibration effects or the non-vibration haptic effects may be sequentially generated in order of priority.

Figure 14:
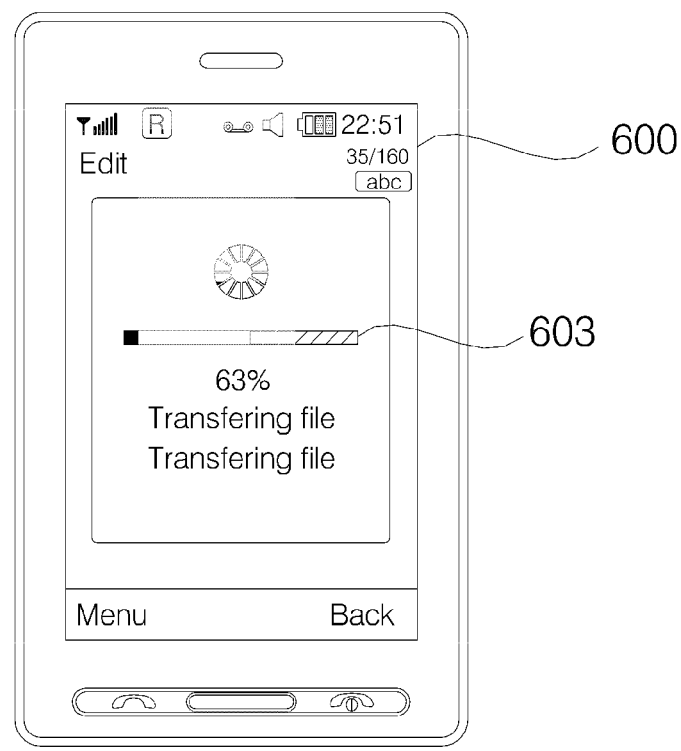
Figure 15:
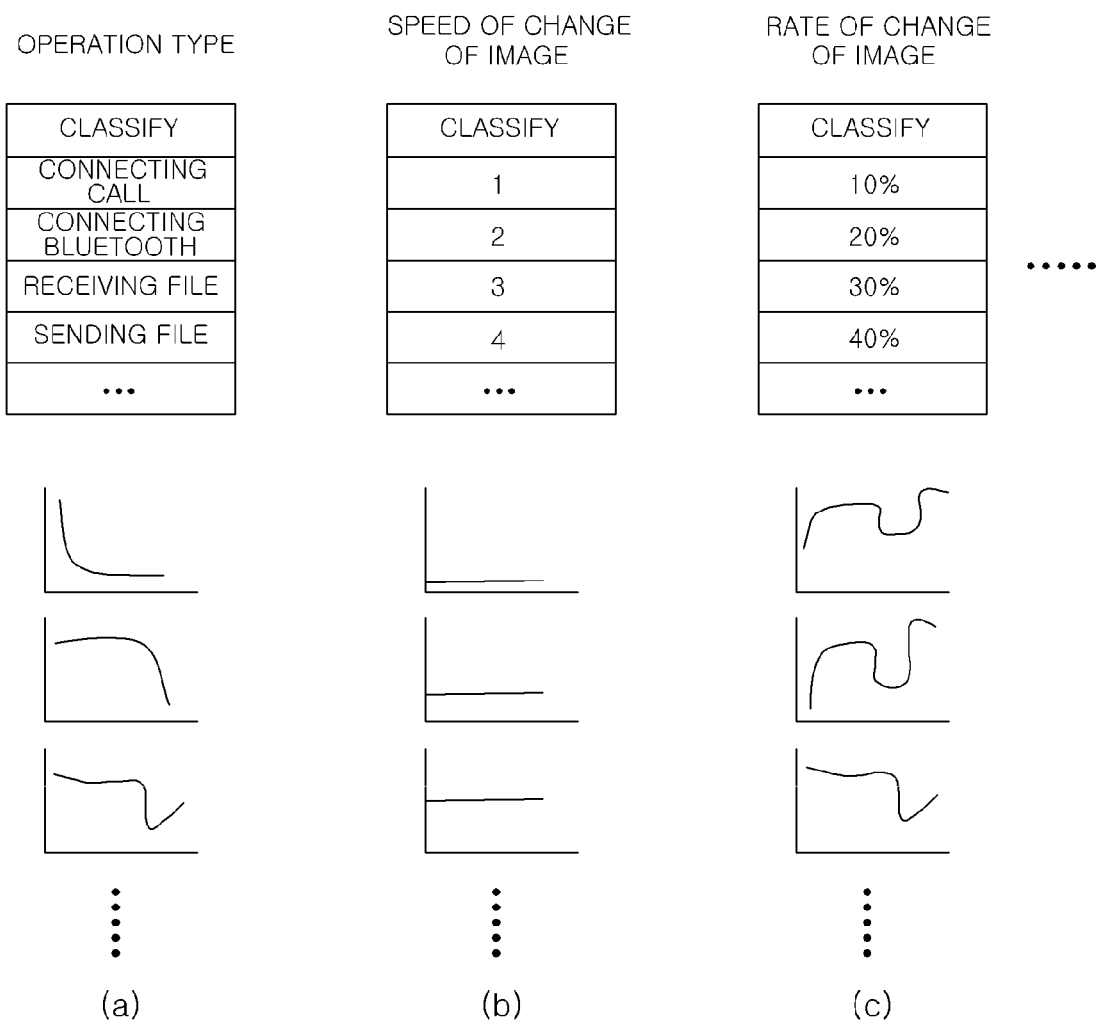

FIG. 14 illustrates a diagram of a file transmission screen 600. Referring to FIG. 14, if a user chooses to transmit a file, the file transmission screen 600 may be displayed. The file transmission screen 600 includes a progress bar 603, which indicates how much of the transmission of a file has been done. A haptic effect may be generated in accordance with a change in the progress bar 603 or a change in an image or an animated image. Different haptic effects may be generated for different types of images or animated images. FIG. 15 illustrates diagrams for explaining how to generate different haptic effects having different patterns or different intensities for different types of operations, different speeds of change of an image or for different rates of change of an image. Referring to FIG. 15, the intensity and the pattern of vibration may be set for each desired item.

Figure 16:
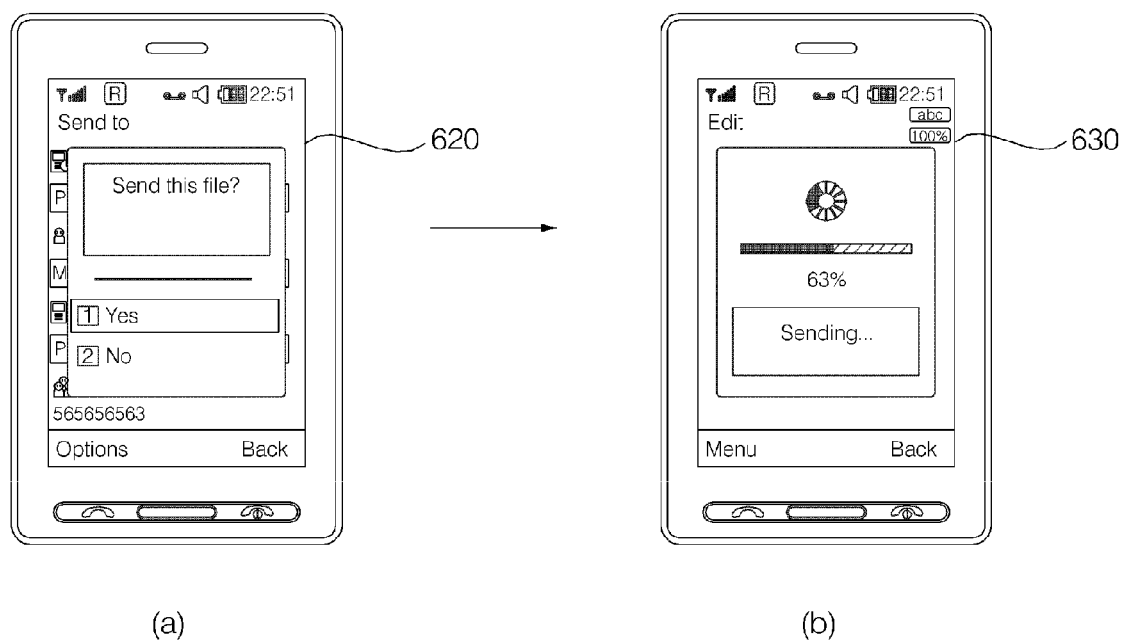

FIG. 16 illustrates diagrams for explaining how to generate a haptic effect in accordance with the progress in an operation. If a user chooses to send a file from a screen 620 for sending a file, as illustrated in FIG. 16(a), a file transmission screen 630 may be displayed, as illustrated in FIG. 16(b). Thereafter, a haptic effect may be generated in accordance with the progress in the transmission of a file. More specifically, the configuration of an operation execution screen may change in various manners for various operating states of the mobile terminal 100 such as at the beginning of an operation, in the middle of the operation, at the end of the operation, upon the occurrence of an error at the beginning of the operation, upon the occurrence of an error during the operation, or upon the occurrence of an error at the end of the operation.

Figure 17:
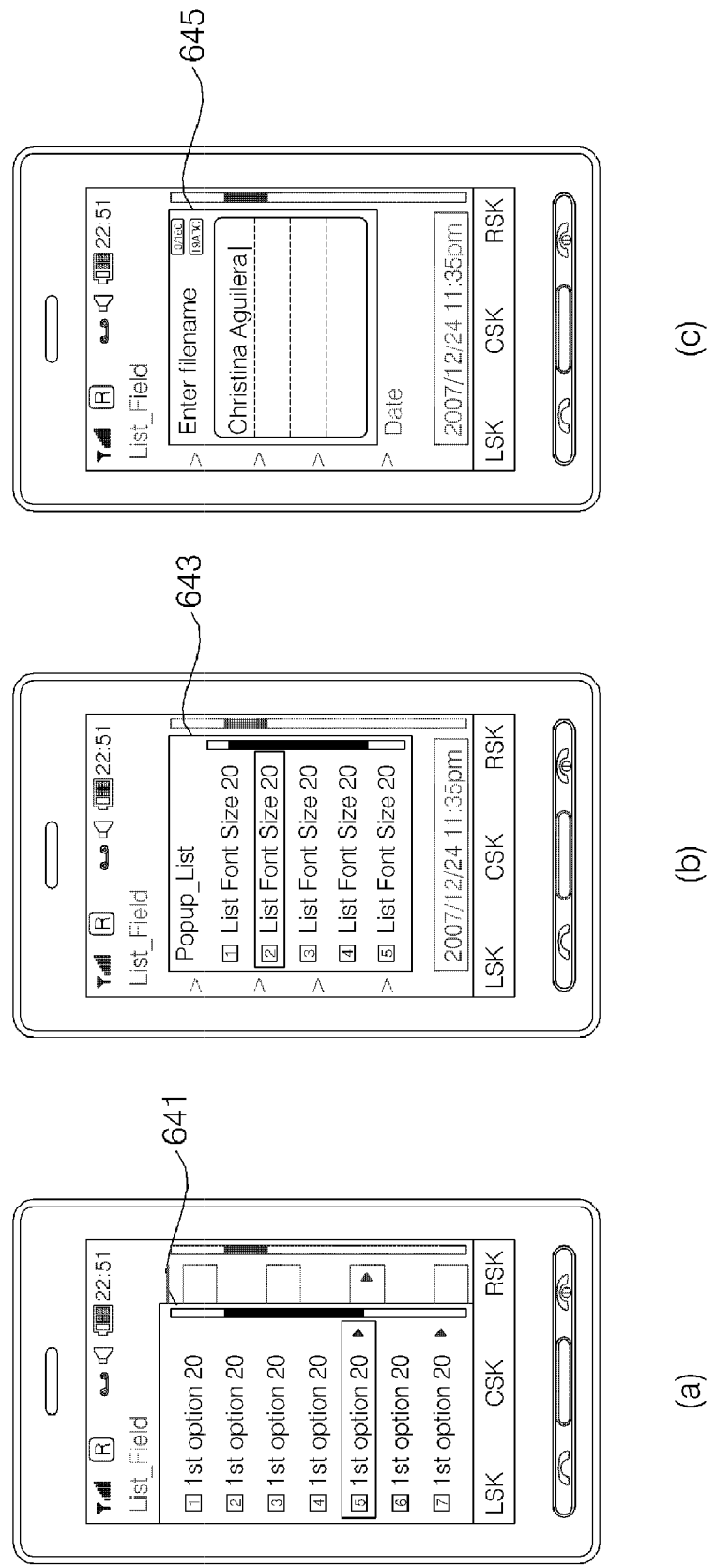

A haptic effect may be generated in accordance with a change in the configuration of the operation execution screen, and the type of the haptic effect may vary according to the type of operation, the type of animated image, or the progression rate of an operation. FIG. 17 illustrates diagrams of various popup screens. Referring to FIG. 17, when a button or a predetermined position on the screen of the display module 151 is touched, a popup screen 641, 643 or 645 including a menu or a number of icons may be displayed, and a haptic effect corresponding to the popup screen 641, 643 or 645 may be generated. In this case, the type of the haptic effect may vary according to the number of popup screens displayed by the display module 151, the relative position of each of the popup screens to a whole screen, the types of the popup screens, and the ratio of the area of each of the popup screens to the area of the whole screen.

Figure 19:
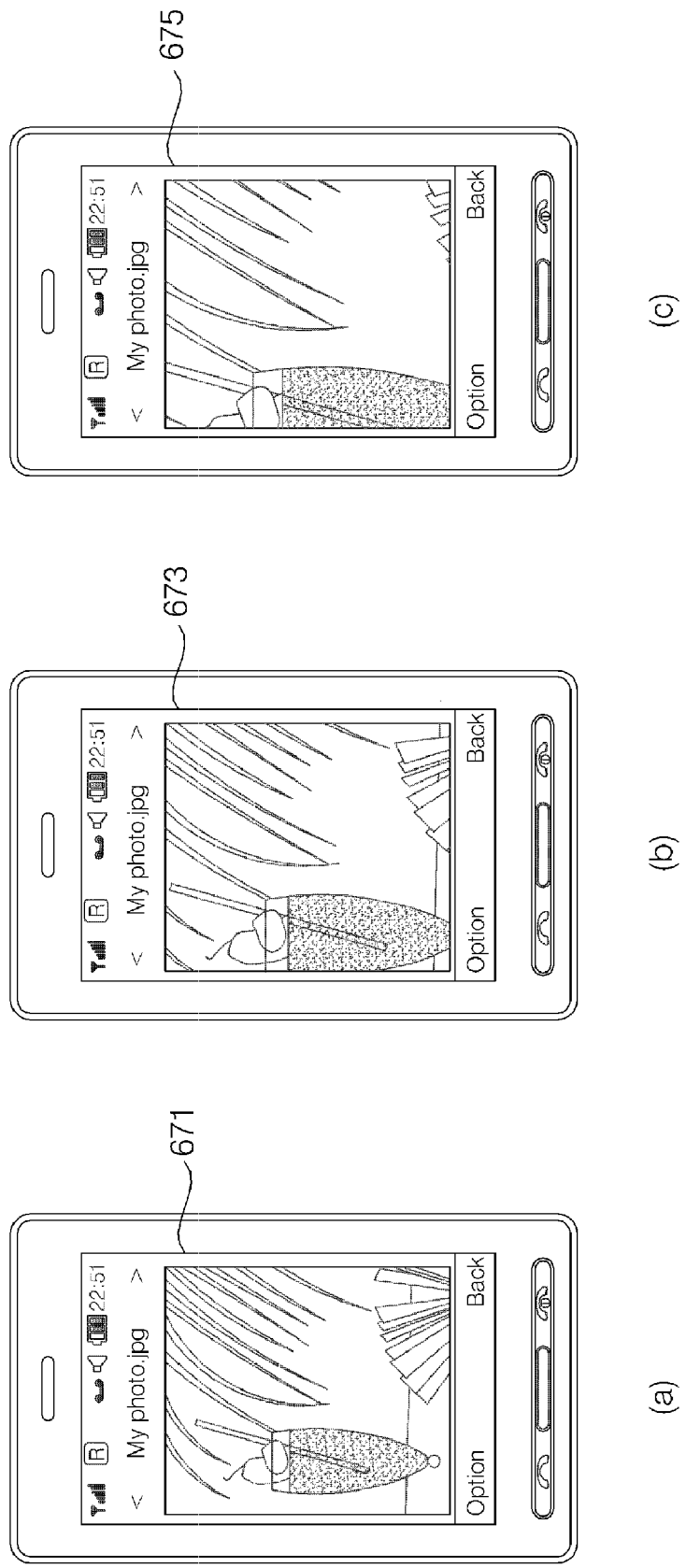

FIG. 18 illustrates diagrams for explaining the rotation of a screen image. If the mobile terminal 100 is rotated by 90° when a screen image 650 is displayed, as illustrated in FIG. 18(a), a screen image 660 obtained by rotating the screen image 650 by 90° may be displayed, as illustrated in FIG. 18(b), and a haptic effect indicating the rotation of the screen image 650 may be generated. FIG. 19 illustrates diagrams for explaining the enlargement or the reduction of a screen image. If a user chooses to enlarge or reduce a current screen image when a screen image 673 is displayed, as illustrated in FIG. 19(b), an enlarged screen image 675 or a reduced screen image 671 of the screen image 671 may be displayed, as illustrated in FIG. 19(c) or 22(a), and a haptic effect corresponding to the enlargement or the reduction of the screen image 673 may be generated. In this case, the type of the haptic effect may vary according to the rate or the speed of enlargement or reduction of the screen image 673.

Figure 20:
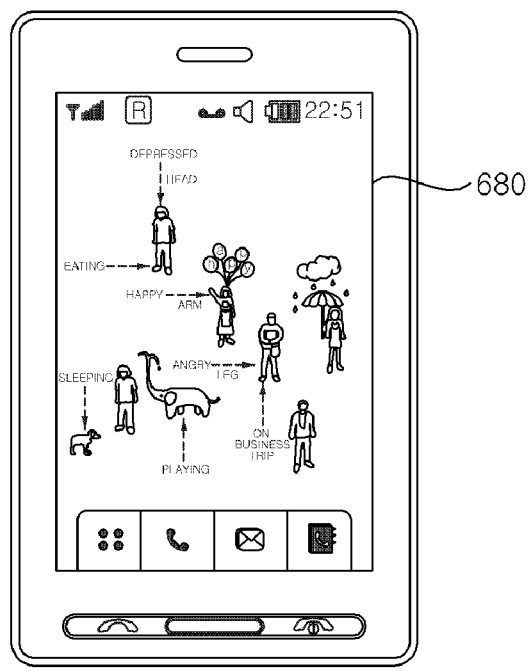

FIG. 20 illustrates a diagram of an idle avatar screen 680. Referring to FIG. 20, if an avatar mode is chosen from a menu for decorating an idle screen, the idle avatar screen 680 may be displayed. If a communication event such as making/ receiving a call or the transmission/reception of messages occurs, a number of avatar images representing the parties who engage in the communication event may be displayed on the idle avatar screen 680, and the shapes of the avatar images may be altered according to the progress in the communication event. In addition, the states of the parties who engage in the communication event, date information, time information may be simple text messages may also be displayed on the idle avatar screen 680. Different avatar images may be designated for different groups registered in a phone book.

Figure 21:
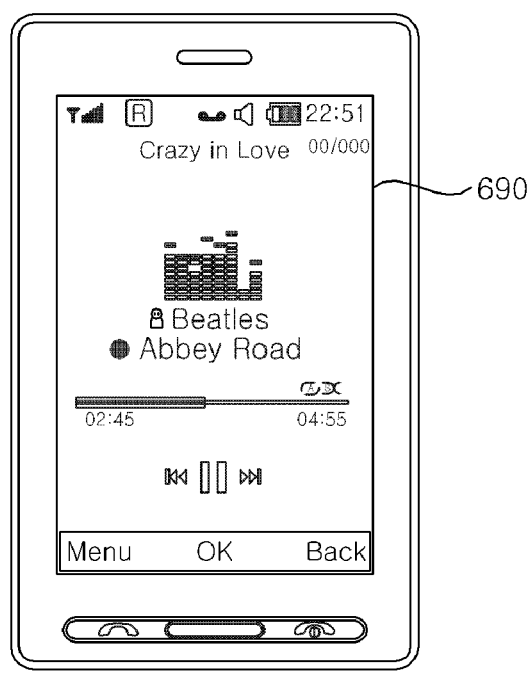

If any one of the avatar images displayed on the idle avatar screen 680 is touched, the configuration of the idle avatar screen 680 may change. In this case, a haptic effect corresponding to the change in the configuration of the idle avatar screen 680 may be generated. The type of the haptic effect may vary according to which of the avatar images displayed on the idle avatar screen 680 has been touched and which part of the touched avatar images has been touched. FIG. 21 illustrates a diagram of a music file play screen 690. Referring to FIG. 21, a haptic effect may be generated in accordance with a change in voice/sound, pitch, frequency or amplitude by using the music file play screen 690.

Figure 22:
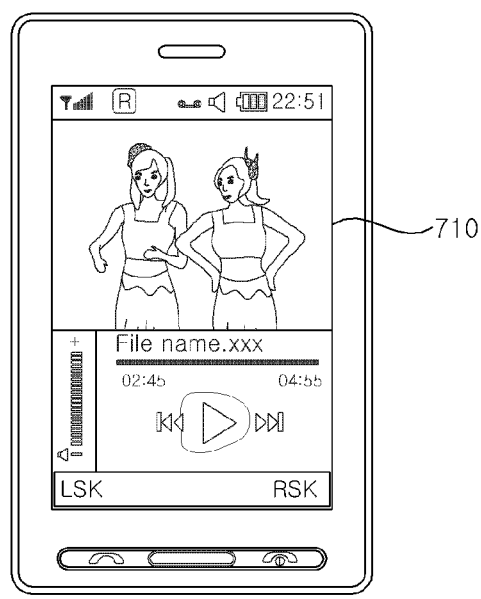

For example, an equalizer showing changes in sound in each frequency band may be displayed on the music file play screen 690. The equalizer may include a plurality of bars respectively representing a plurality of frequency bands, and the size of each of the bars of the equalizer may vary in accordance with a change in sound in a corresponding frequency band. A haptic effect may be generated in accordance with a change in the size of each of the bars of the equalizer. The pattern and the intensity of vibration may vary according to the rate of change of the size of each of the bars of the equalizer. FIGS. 22 through 28 illustrate diagrams for explaining how to generate and store a haptic effect during the reproduction of a moving image file. More specifically, FIG. 22 illustrates a diagram of a moving image reproduction screen 700. Referring to FIG. 22, various haptic effects may be generated for various changes in the moving image reproduction screen 700.

For example, assuming that frames shown in FIGS. 23(a) and 23(b) are previous frames and a frame shown in FIG. 23(c) is a current frame, various vibration effects having different patterns and/or different intensities may be generated according to the rate of change of an image between the previous frames and the current frame. For this, one of a plurality of previous frames stored in advance may be chosen, and the chosen previous frame may be compared with the current frame. A number of objects included in a frame may be recognized by their size. Thus, a haptic effect corresponding to whichever of the objects changes most considerably may be generated. FIG. 24 shows how to set different vibration effects or different non-vibration haptic effects for different rates of change of an image or for objects having different sizes. Referring to FIG. 24, a user may set different haptic effects for different rates of change of an image or for objects having different sizes.

Figure 23:
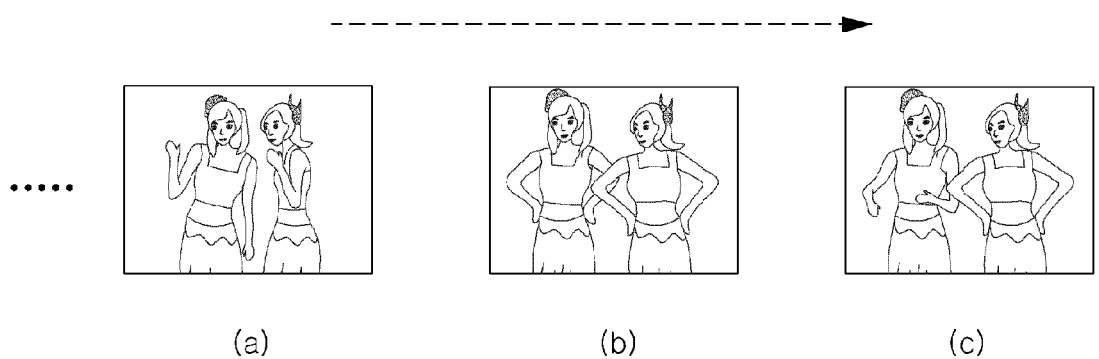
Figure 25:
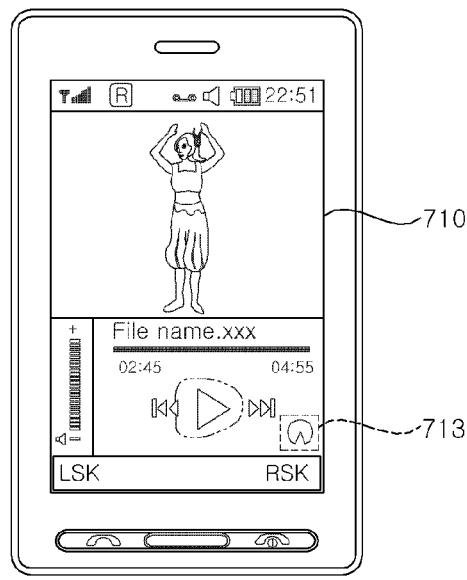

FIG. 25 illustrates a diagram for explaining how to set a haptic effect with the use of a moving image screen 710. Referring to FIG. 25, if a user chooses to reproduce a moving image file, the moving image screen 710 may be displayed. The moving image screen 710 may include an icon 713 for setting a haptic effect such as vibration. If the user chooses the icon 713, the user may set a haptic effect for each desired frame of the moving image file, as illustrated in FIG. 23. If the user sets a vibration effect for a moving image file, vibration data corresponding to the vibration effect may be stored along with synchronization information so as to be synchronized with the moving image file.

Figure 26:
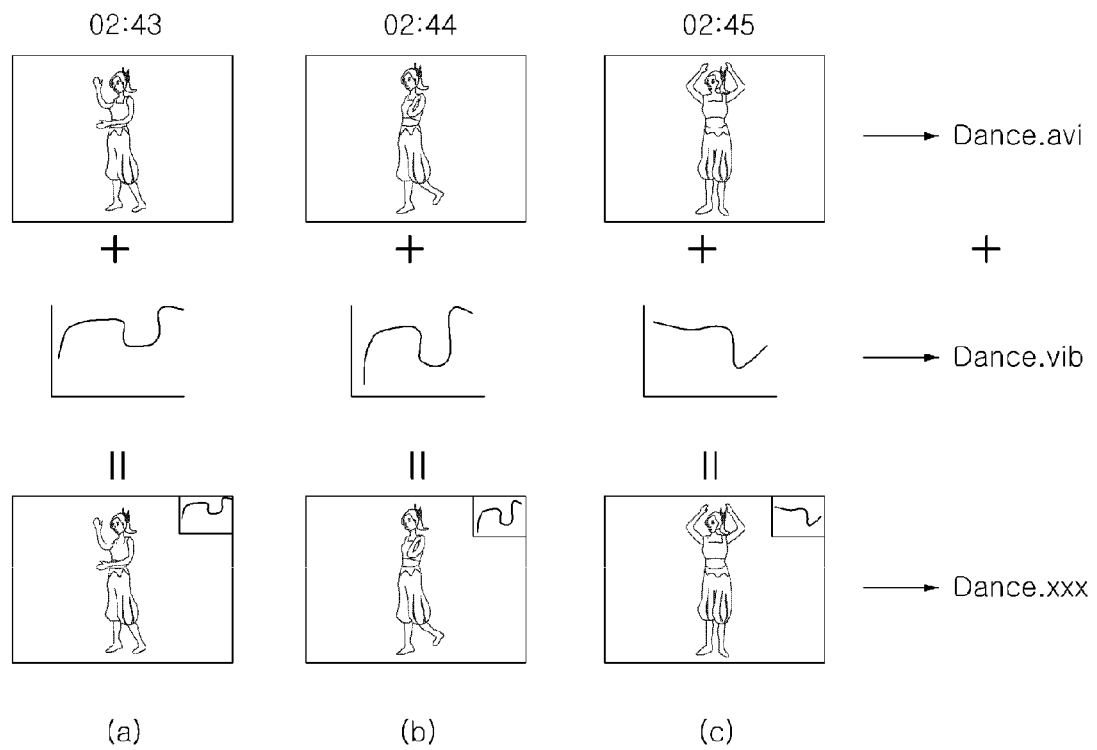

Referring to FIG. 26, if the moving image file is 'Dance.avi', the vibration data may be stored as 'Dance.vib'. That is, the vibration data may be stored as a file sharing the same file name as that of the moving image file but having a different extension from that of the moving image file. Therefore, if there is a vibration data file having the same file name as that of a moving image file, the moving image file may be reproduced along with the vibration data file. On the other hand, if there is no vibration data file having the same file name as that of a moving image file, only the moving image file may be reproduced. This exemplary embodiment may be applied not only to moving image files but also to music files.

Figure 27:
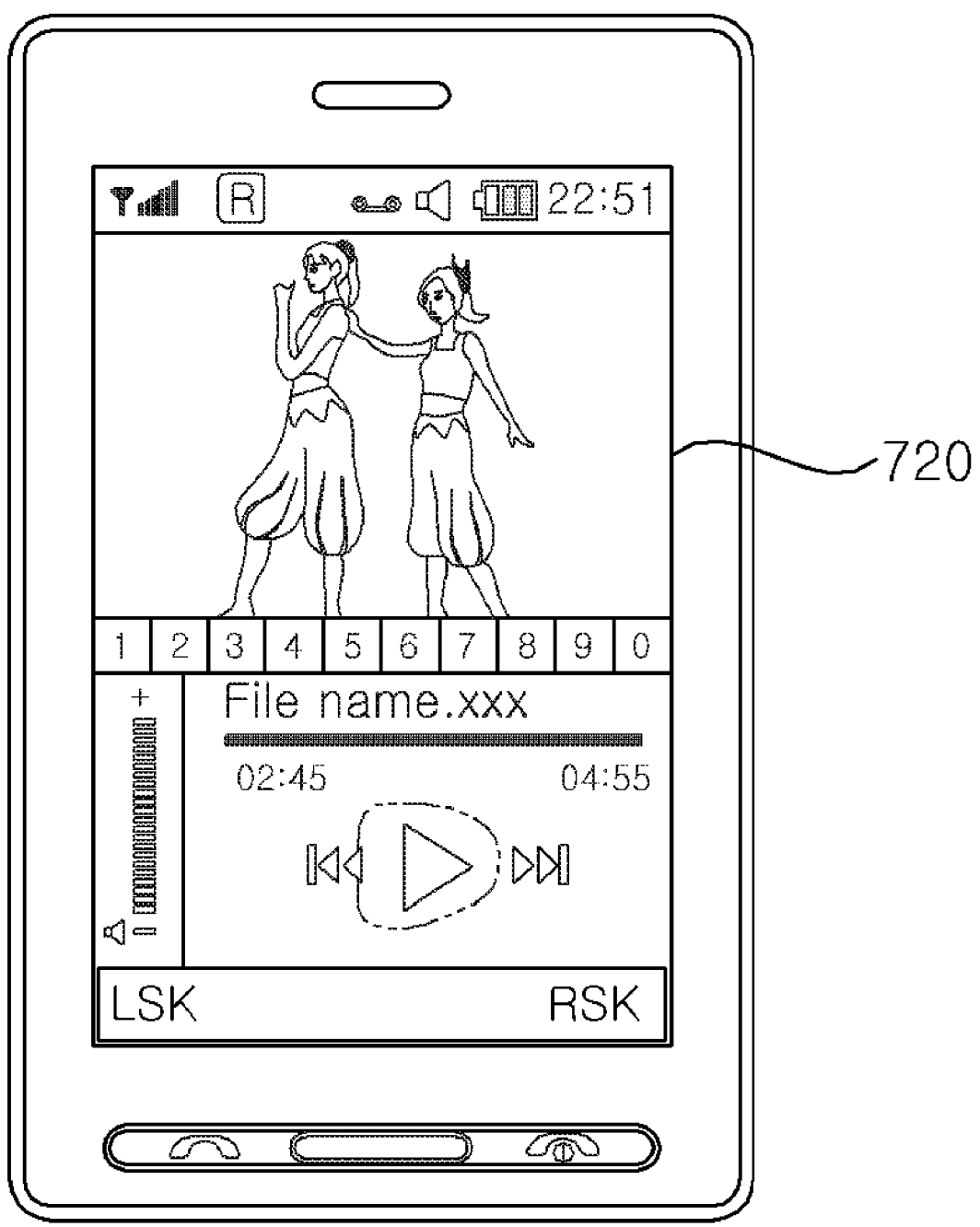
Figure 28:
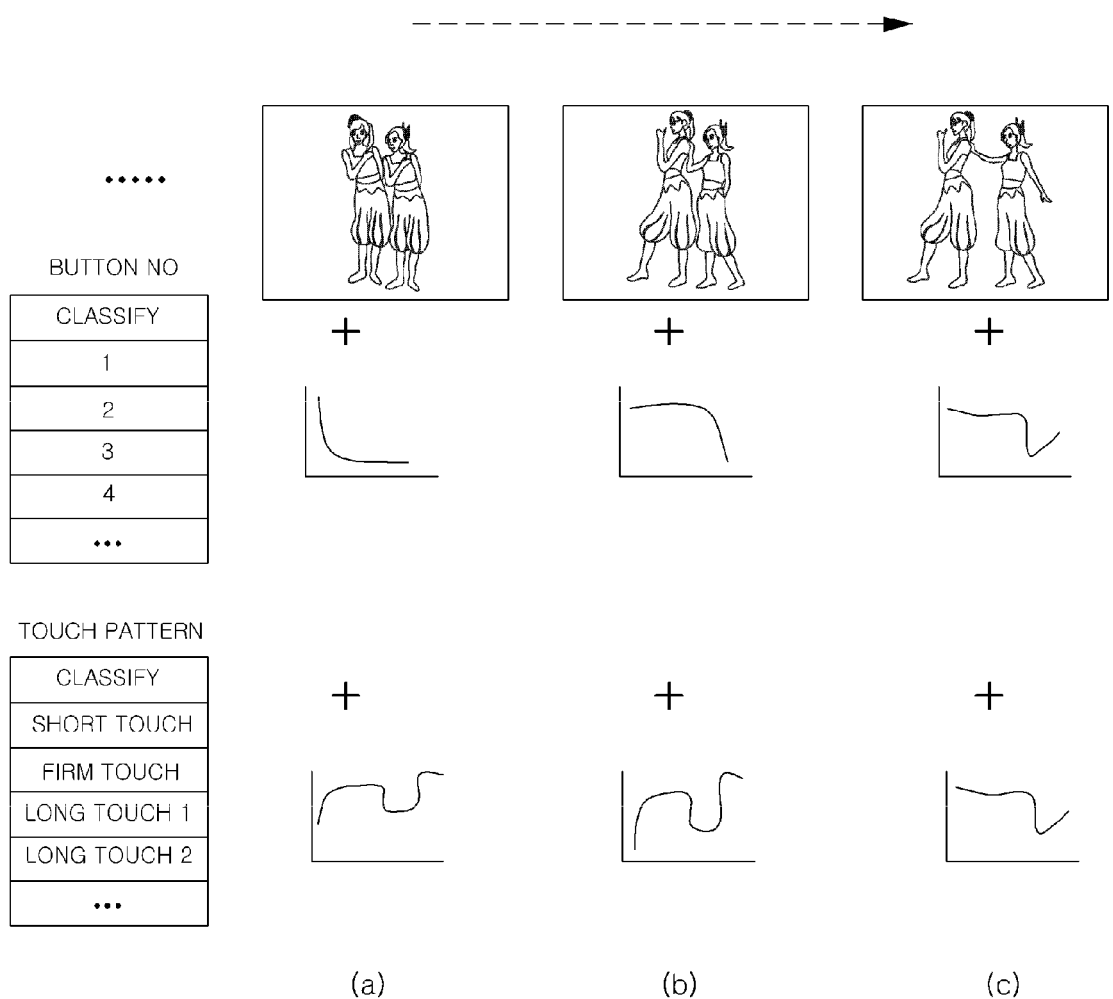

If a number of number icons or menu icons are displayed at a lower portion of a moving image screen 720, as illustrated in FIG. 27, vibration may be generated in various manners according to which of the number icons or the menu icons is chosen. More specifically, referring to FIG. 28, various vibration effects may be set using the moving image screen 720 so that the pattern and the intensity of vibration can vary according to which of a plurality of icons displayed on the moving image screen 720 has been chosen and how the chosen icon has been touched, i.e., whether the chosen icon has been touched for a short time or for a long time and whether the chosen icon has been touched lightly or firmly.

Figure 29:
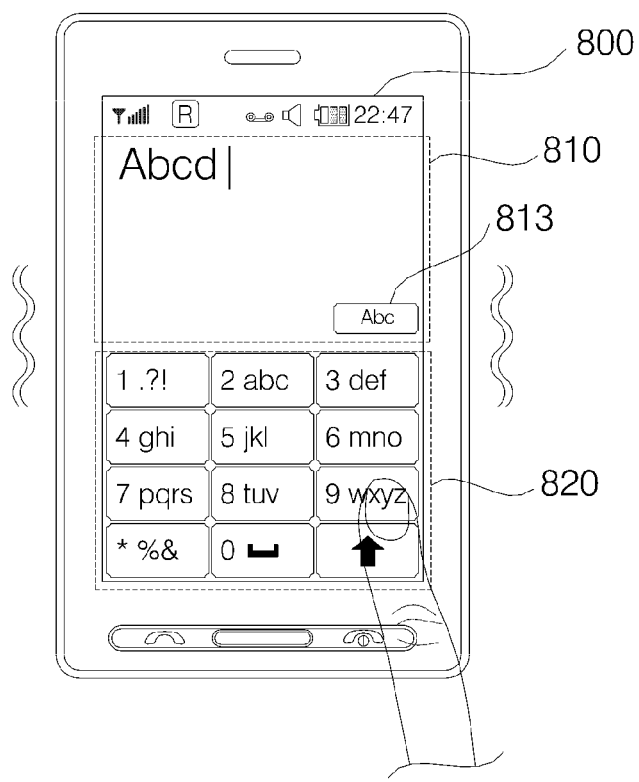
FIGS. 29 through 39 illustrate diagrams for explaining how to generate a haptic effect according to the content of information displayed on the screen of the display module of the mobile terminal shown in FIG. 1 in accordance with one embodiment.
Figure 30:
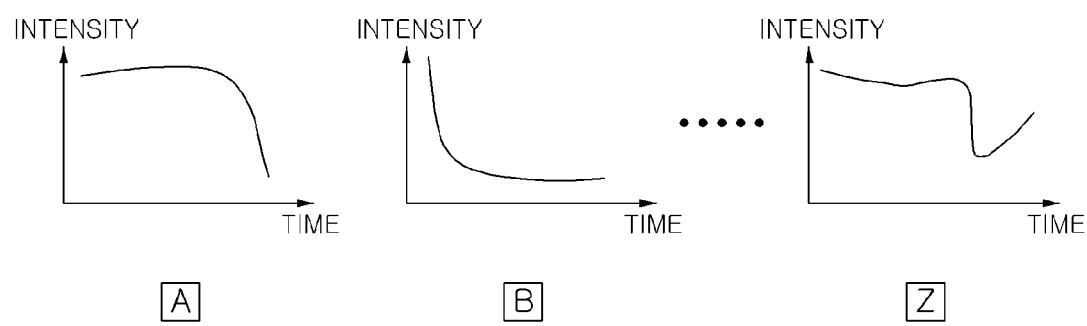

FIGS. 29 through 39 illustrate diagrams for explaining how to generate a haptic effect according to the content of information displayed on the screen of the display module 151. More specifically, FIG. 29 illustrates a diagram of a character input window 820. Referring to FIG. 29, the character input window 820 and a display window 810 may be displayed on a screen 800 of the display module 151. The character input window 820 may include a plurality of touch keys for inputting numerals to the screen 800 during a call mode. The display window 810 may display a number of numerals input through the character input window 820. Different haptic effects may be generated for different characters mapped to each of the touch keys of the character input window 820.

If a character is input using the character input window 820, a haptic effect may be generated in consideration of the configuration of the input character. More specifically, if vibration is output in response to a touch input for each of the touch keys of the character input window 820, different vibration effects may be designated for different characters mapped to each of the touch keys of the character input window 820. In this manner, a user may be able to easily recognize a character input by himself/herself based on the pattern and the intensity of vibration output by the mobile terminal 100 without the need to look at the screen of the mobile terminal 100.

Figure 31:
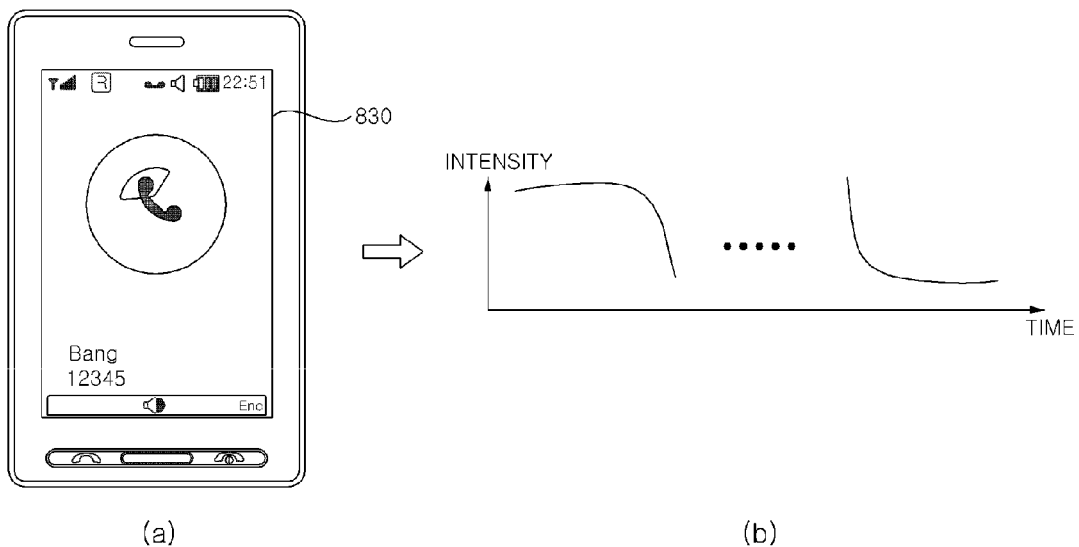

FIG. 31 illustrates a diagram of a call reception screen 830. Referring to FIG. 31, if a request for a call connection is issued, the call reception screen 830 may be displayed. In this case, caller information regarding a caller who has issued the request may be analyzed, and a haptic effect corresponding to the caller may be generated. In addition, if another call or a message is received during a call with the caller, caller information corresponding to the received call or the received message may be analyzed. If the received call or message is associated with any one of a plurality of phone numbers registered in a phone book, a haptic effect corresponding to the caller of the received call or message may be generated. On the other hand, if the received call or message is not associated with any one of the registered phone numbers, a haptic effect corresponding to the phone number of the received call or message may be generated.

Figure 32:
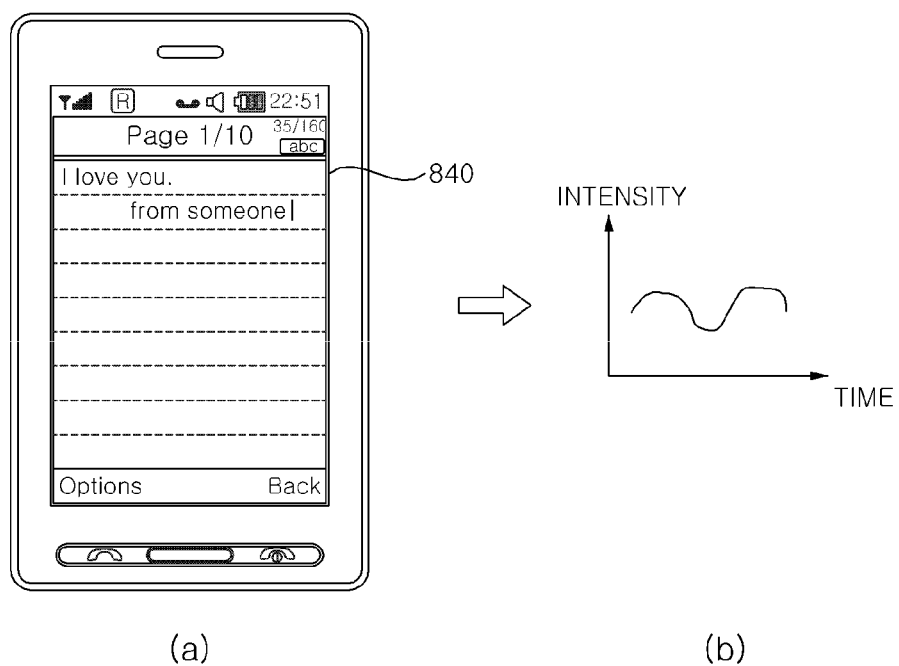

FIG. 32 illustrates a diagram of a message reception screen 840. Referring to FIG. 32, if a message is received during a call, a predetermined word may be parsed from the received message, and a haptic effect corresponding to the parsed word may be generated. The predefined word may be chosen in advance by a user. If vibration is generated as a haptic effect, the intensity and the pattern of vibration to be generated for the predefined word may be set and altered by the user. If a message is received, the content of the received message may be analyzed. If the results of the analysis indicate that the received message includes a predefined word for which a haptic effect is to be generated, a haptic effect corresponding to the predefined word may be generated. The predefined word may be chosen in advance by the user, and the pattern and the intensity of the haptic effect may be set by the user.

During a call with a caller or a callee, the speech of the caller or the callee may be analyzed. If the speech of the caller or the callee includes a predefined word, a haptic effect corresponding to the predefined word may be generated. The predefined word may be chosen in advance by the user. If the voice of the caller or the callee is stored in a database, a haptic effect corresponding to the voice of the caller or the callee may be generated. In addition, if a change in the voice or the voice volume of the caller or the callee is detected during the call with the caller or the callee, a haptic effect corresponding to the voice change or the voice volume change may be generated.

Figure 33:
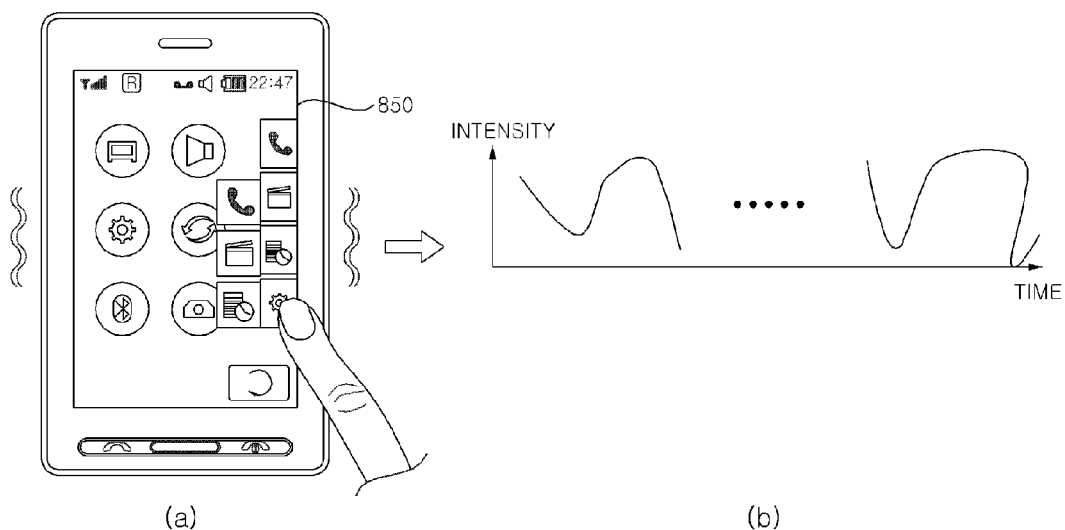

FIG. 33 illustrates a diagram of a screen image 850 including a plurality of menu icons. Referring to FIG. 33, if a user touches or approaches and thus chooses one of the menu icons, the name of the chosen menu icon may be analyzed, and a haptic effect corresponding to the name of the chosen menu icon may be generated. For example, if the user chooses a menu icon 'setting', haptic effects (such as vibration effects) respectively corresponding to alphabet letters 's', 'e', 't', 't', 'i', 'n', and 'g' may be sequentially output. Alternatively, the user may set a haptic effect for the word 'setting' in advance. In this case, the haptic effect corresponding to the word 'setting' may be generated.

In order to enter a menu corresponding to the chosen menu icon, the chosen menu icon may be touched. In this case, a haptic effect corresponding to the menu may be generated. If a menu icon other than the chosen menu icon is chosen during the generation of a haptic effect corresponding to the chosen menu icon, the generation of the haptic effect corresponding to the previously-chosen menu icon may be terminated, and a haptic effect corresponding to the newly-chosen menu icon may be generated. In this manner, the user may easily recognize a menu icon chosen by himself/herself based on a haptic effect generated by the mobile terminal 100.

Figure 34:
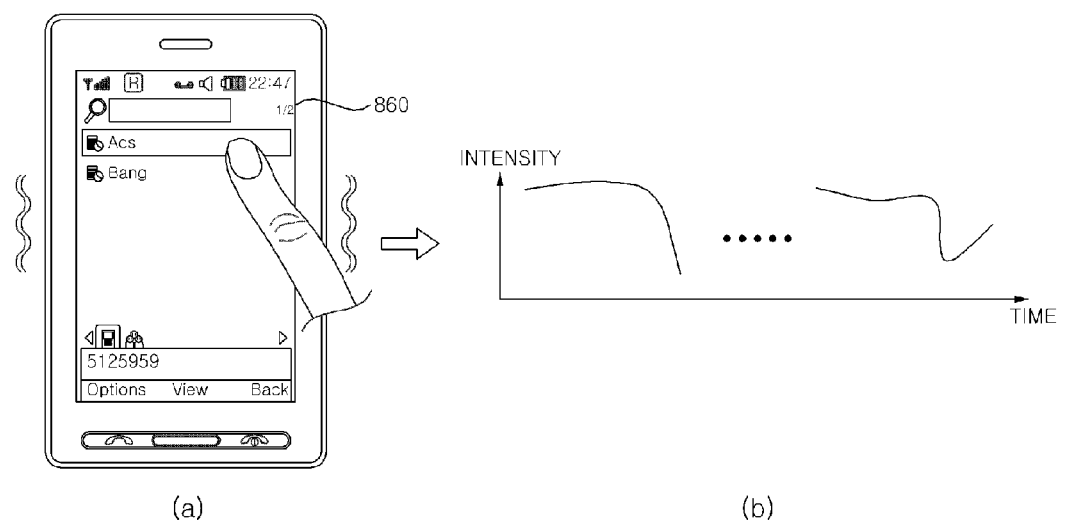

FIG. 34 illustrates a diagram of a phone book list screen 860. Referring to FIG. 34, if a user touches and thus chooses one of a plurality of items displayed on the phone book list screen 860, the name of a person corresponding to the chosen item may be analyzed, and a haptic effect may be generated according to the results of the analysis. If the user looks someone up in a phone book by inputting a character string to the phone book list screen 860, the input character string may be analyzed, and a haptic effect corresponding to the input character string may be generated.

Figure 35:
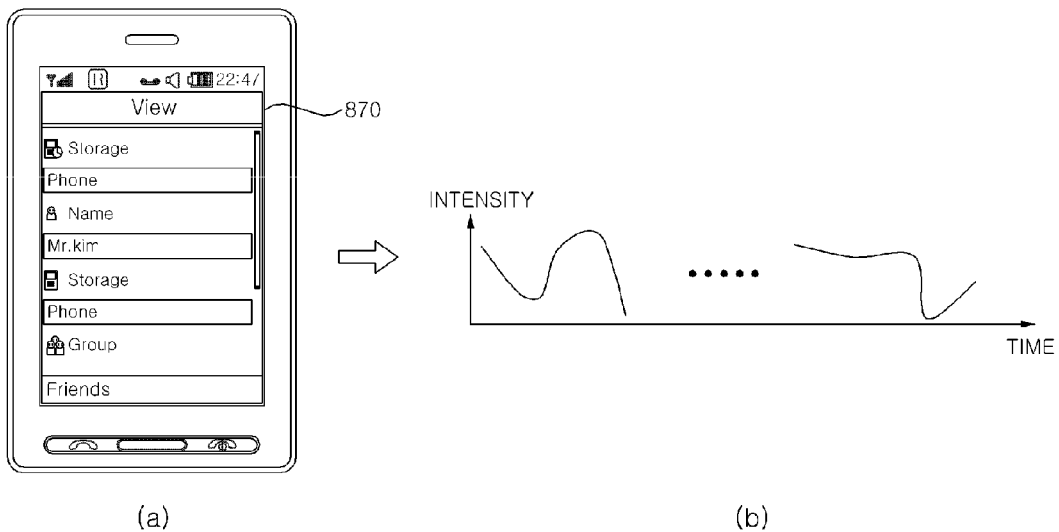

FIG. 35 illustrates a diagram of a screen image 870 displayed when one of the items of the phone book list screen 860 is chosen. Referring to FIG. 35, if one of the items of the phone book list screen 860 is chosen, a group information string corresponding to the chosen item may be analyzed, and a haptic effect may be generated according to the results of the analysis. Alternatively, a haptic effect corresponding to various information, other than group information, may be generated. For example, a haptic effect corresponding to a phone number or a memo stored in a phone book may be generated, or a haptic effect indicating whether an image or an avatar is registered may be generated.

Figure 36:
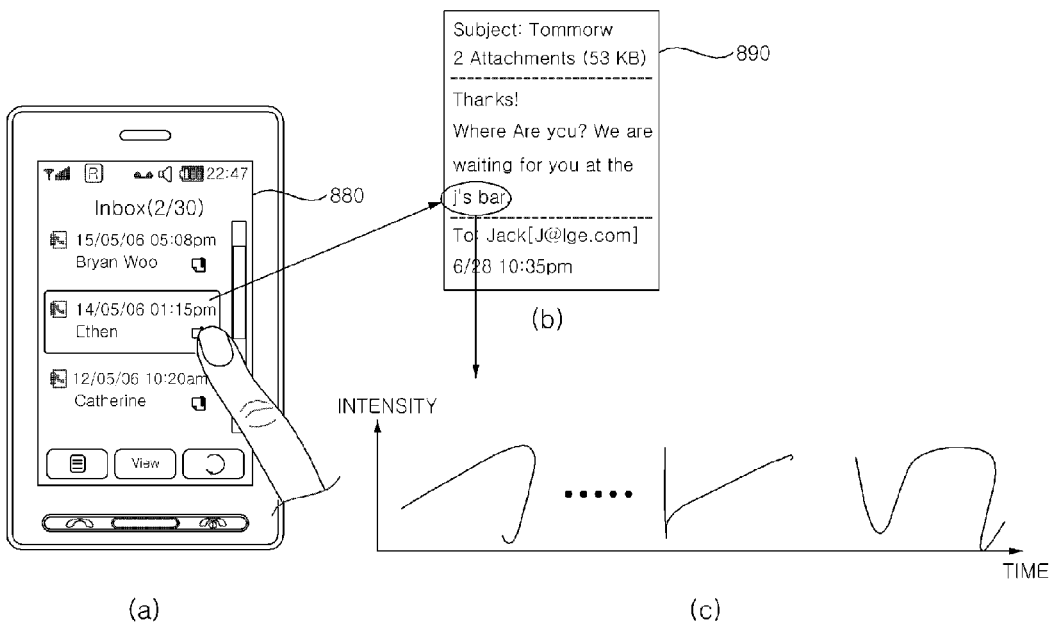

FIG. 36 illustrates a diagram of a message list screen 880. Referring to FIG. 36, if a user chooses to view a list of received messages or sent messages, the message list screen 880 may be displayed. If the user touches one of a plurality of items displayed on the message list screen 880, a message 890 corresponding to the chosen item may be parsed. If the results of the parsing indicate that the message 890 includes a predefined word, a haptic effect corresponding to the predefined word may be generated. If a message has a file attached thereto, a haptic effect corresponding to the type of the attached file may be generated. That is, the attached file may be classified into, for example, a music file, a game file, or a moving image file, according to the extension of the attached file, and a haptic effect corresponding to the type of the attached file may be generated. In this manner, different haptic effects may be generated for different types of attached files.

For example, if a message has a game file attached thereto, a haptic effect corresponding to game files may be generated. If a haptic effect is yet to be designated for game files, a haptic effect corresponding to a string of alphabet letters 'g', 'a', 'm', and 'e' may be generated. If a message has an image file or a music file attached thereto, a haptic effect may be generated in the above-described manner.

Figure 37:
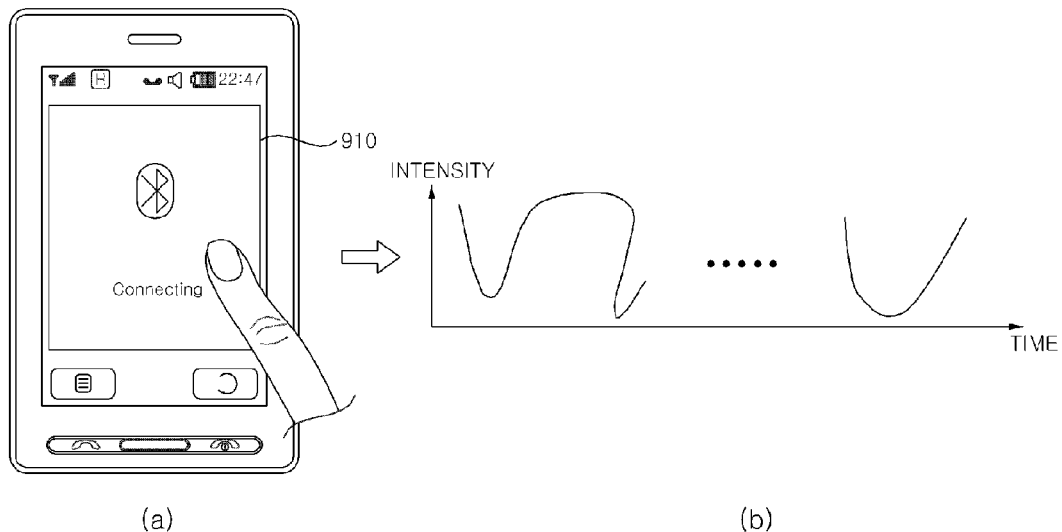

FIG. 37 illustrates a diagram of a short-range communication connection screen 910. Referring to FIG. 37, if the mobile terminal 100 is within a short range of a communication device and can thus communicate with the communication device using a short-range communication method such as Bluetooth, the short-range communication connection screen 910 may be displayed. In this case, a haptic effect corresponding to the communication device or a haptic effect indicating that a short-range communication channel has been established between the mobile terminal 100 and the communication device may be generated.

If the mobile terminal 100 receives a file from the communication device through short-range communication, a haptic effect corresponding to the type of the received file may be generated. That is, the received file may be classified into, for example, an image file, a music file, or a game file, and a haptic effect corresponding to the type of the received file may be generated. For example, if the received file is an image file, a haptic effect corresponding to image files may be generated. If a haptic effect is yet to be designated for image files, a haptic effect corresponding to a string of alphabet letters 'i', 'm', 'a', 'g', and 'e' may be generated. In this manner, a user may easily recognize the type of the received file based on a haptic effect generated by the mobile terminal 100 without the need to open the received file.

Figure 38:
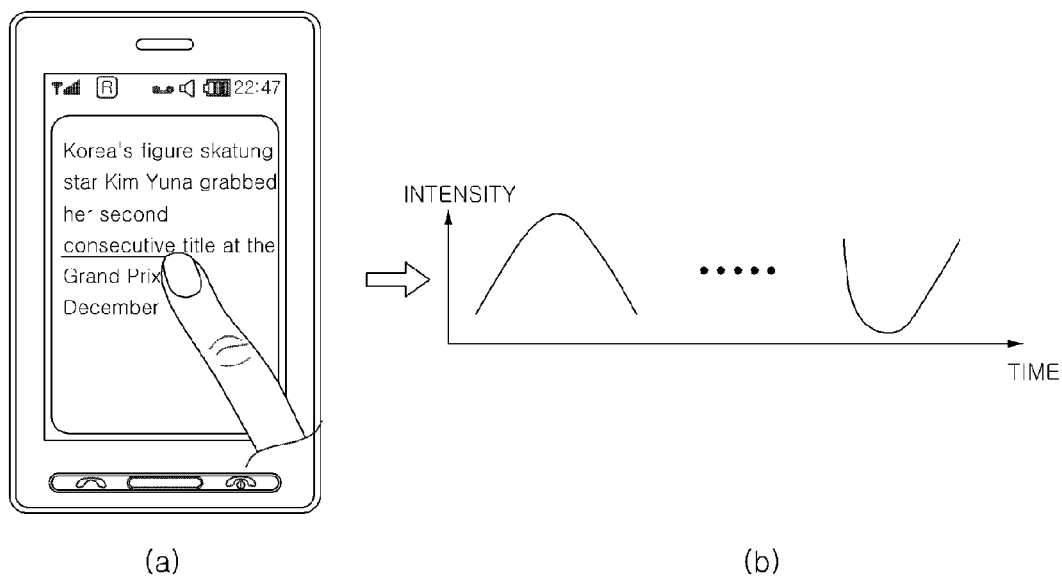

FIG. 38 illustrates a diagram of a document viewer screen 920. Referring to FIG. 38, if a predetermined word included in a document displayed on the document viewer screen 920 is touched and thus chosen, the chosen word may be analyzed, and a haptic effect corresponding to the chosen word may be generated. That is, if the chosen word is registered in a wordbook, a user's dictionary or a recent search list database, a haptic effect corresponding to the chosen word may be generated. If the chosen word is touched again during the generation of the haptic effect corresponding to the chosen word, a wordbook or dictionary screen may be displayed.

Figure 39:
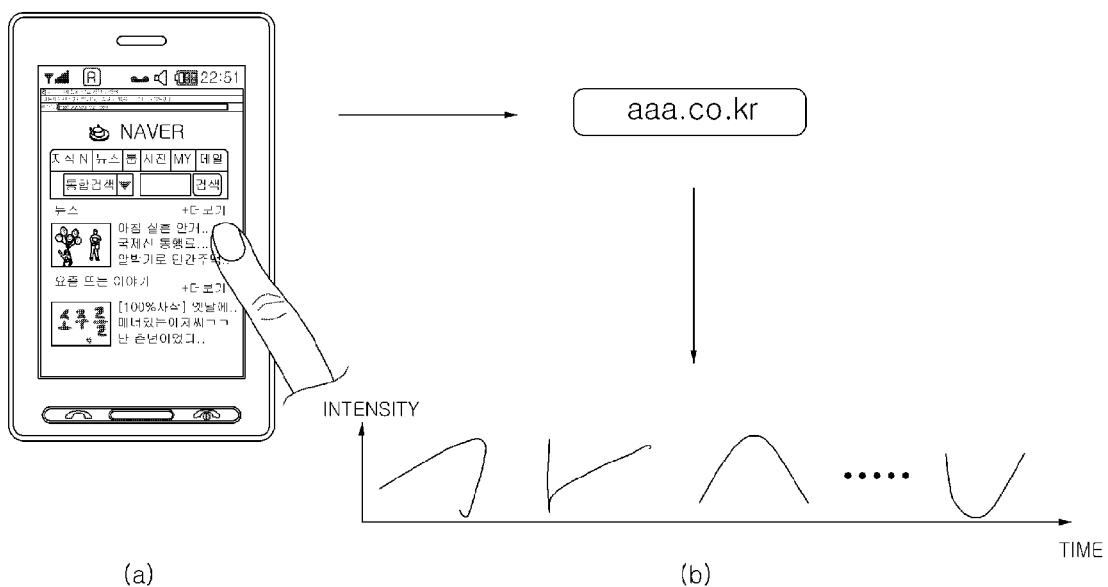

FIG. 39 illustrates a diagram of a web page screen 930. Referring to FIG. 39, if a uniform resource locator (URL) displayed on the web page screen 930 is touched, a vibration effect or a non-vibration haptic effect corresponding to the character pattern of the URL may be generated. If the URL is touched again during the generation of the haptic effect corresponding to the character pattern of the URL or the URL is touched for more than a predefined amount of time, a web page corresponding to the URL may be displayed. If a web browser is executed and a link corresponding to a URL registered as Favorites is touched, the character pattern of the URL may be analyzed, and a haptic effect corresponding to the character pattern of the URL may be generated. In this case, if the URL is touched again during the generation of the haptic effect corresponding to the character pattern of the URL, a web page corresponding to the touched link may be displayed.

The mobile terminal according to the present invention and the method of controlling a mobile terminal according to the present invention are not restricted to the exemplary embodiments set forth herein. Therefore, variations and combinations of the exemplary embodiments set forth herein may fall within the scope of the present invention. The present invention can be realized as computer-readable code written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to the present invention, it is possible to generate various haptic effects having different intensities and/or different patterns according to the configuration of a character input to a touch screen, the settings of a mobile terminal or the content of information displayed by the mobile terminal. Thus, it is possible for a user to easily recognize the settings of a mobile terminal or the content of information displayed by the mobile terminal by using the sense of touch, rather than using the sense of vision. Therefore, it is possible to easily control the operation of a mobile terminal.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a mobile terminal, the method comprising:
   displaying a character input window for inputting a character string via a touch input on a touch screen;
   receiving an input character string through the character input window, the input character having a configuration; and
   outputting a control signal for controlling a haptic module to generate a haptic effect corresponding to the configuration of the input character string.

2. The method of claim 1, further comprising:
   controlling the haptic module to generate a haptic effect in response to the control signal.

3. The method of claim 2, wherein the haptic module generates different haptic effects for different constituents of each character string, for different syllables, for different initial consonants, for different morphemes, for different parts of speech, or for different tones of syllables.

4. The method of claim 2, further comprising displaying an image corresponding to the haptic effect on the touch screen.

5. The method of claim 1, further comprising:
   outputting a control signal for controlling the haptic module to generate a haptic effect corresponding to a predefined word when the input character string comprises the predefined word.

6. The method of claim 1, further comprising displaying the input character string on the touch screen.

7. The method of claim 1, wherein the character input window comprises a keypad input window, a handwriting input window, a continuous handwriting input window, or a QWERTY input window.

8. The method of claim 1, wherein the haptic effect comprises vibration.

9. The method of claim 1, further comprising providing a menu for setting a type, intensity, or pattern of the haptic effect.

10. A mobile terminal, comprising:
    a touch screen configured to display a character input window for inputting a character string through touch input;
    a haptic module configured to generate a haptic effect; and
    a controller configured to:
       receive an input character string through the character input window; and
       control the haptic module to generate a haptic effect corresponding to the configuration of the input character string.

11. The mobile terminal 10, wherein the controller is further configured to control the haptic module to generate different haptic effects for different constituents of each character string, for different syllables, for different initial consonants, for different morphemes, for different parts of speech, or for different tones of syllables.

12. The mobile terminal 10, wherein the haptic effect comprises vibration.

13. A method of controlling a mobile terminal, the method comprising:
    receiving a request for connecting a call from a caller;
    detecting caller information regarding the caller;
    outputting a first control signal for controlling a haptic module to generate a haptic effect corresponding to the caller information; and
    outputting a second control signal for controlling the haptic module to generate a haptic effect corresponding to a predetermined event when the predetermined event occurs during the call from the caller.

14. The method of claim 13, further comprising controlling the haptic module to generate a haptic effect in response to the first control signal or the second control signal.

15. The method of claim 13, further comprising connecting a call to the caller.

16. The method of claim 13, wherein the haptic effect comprises vibration.

17. A method of controlling a mobile terminal, the method comprising:
    receiving a request for connecting a call from a caller;
    detecting caller information regarding the caller;
    outputting a first control signal for controlling a haptic module to generate a haptic effect corresponding to the caller information; and
    outputting a second control signal for controlling the haptic module to generate a haptic effect corresponding to a change in the voice or the voice volume of the caller when the change in the voice or the voice volume of the caller is detected during the call with the caller.

18. A method of controlling a mobile terminal, the method comprising:
    receiving a request for connecting a call from a caller;
    detecting caller information regarding the caller;
    outputting a first control signal for controlling a haptic module to generate a haptic effect corresponding to the caller information; and
    outputting a second control signal for controlling the haptic module to generate a haptic effect corresponding to receiving a predefined word when a message including the predefined word is received during the call with the caller.

19. A method of controlling a mobile terminal, the method comprising:
    receiving a request for connecting a call from a caller;
    detecting caller information regarding the caller;
    outputting a first control signal for controlling a haptic module to generate a haptic effect corresponding to the caller information; and
    outputting a second control signal for controlling the haptic module to generate a haptic effect corresponding to the predefined word when a voice signal corresponding to a predefined word is received during the call with the caller.

20. A mobile terminal, comprising:
    a wireless communication unit configured to connect a call;
    a haptic module configured to generate a haptic effect; and
    a controller configured to:
       receive a request for connecting a call from a caller to detect caller information regarding the caller;
       output a first control signal for controlling a haptic module to generate a haptic effect corresponding to the caller information; and
       output a second control signal for controlling the haptic module to generate a haptic effect corresponding to a predetermined event when the predetermined event occurs during the call from the caller.

21. A mobile terminal, comprising:
a wireless communication unit configured to connect a call;
a haptic module configured to generate a haptic effect; and
a controller configured to:
receive a request for connecting a call from a caller to detect caller information regarding the caller;
output a first control signal for controlling a haptic module to generate a haptic effect corresponding to the caller information; and
output a second control signal for controlling the haptic module to generate a haptic effect corresponding to a change in a voice or a voice volume of the caller when the change in the voice or the voice volume of the caller is detected during the call with the caller.

22. A mobile terminal, comprising:
a wireless communication unit configured to connect a call;
a haptic module configured to generate a haptic effect; and
a controller configured to:
receive a request for connecting a call from a caller to detect caller information regarding the caller;
output a first control signal for controlling a haptic module to generate a haptic effect corresponding to the caller information; and
output a second control signal for controlling the haptic module to generate a haptic effect corresponding to a predefined word when a message including the predefined word is received during the call with the caller.

23. A method of controlling a mobile terminal, the method comprising:
displaying one or more menu icons;
choosing one menu icon of the one or more menu icons; and
outputting a first control signal for controlling a haptic module to generate a haptic effect corresponding to the chosen menu icon.

24. The method of claim 23, further comprising controlling the haptic module to generate a haptic effect in response to the control signal.

25. The method of claim 23, further comprising displaying the chosen menu icon differently from other menu icons of the one or more menu icons.

26. The method of claim 23, further comprising;
receiving a touch input or a proximity input,
wherein the choosing of the one menu icon is in response to the receipt of the touch input or the proximity input.

27. The method of claim 23, wherein the choosing of the one menu icon is a first choosing, the method further comprising;
choosing the chosen menu icon a second time; and
entering a menu corresponding to the chosen menu icon when the chosen menu icon is chosen the second time.

28. The method of claim 27, further comprising outputting a second control signal for controlling the haptic module to generate a haptic effect corresponding to the menu.

29. The method of claim 23, wherein the haptic effect comprises vibration.

30. A mobile terminal comprising:
a touch screen configured to display one or more menu icons;
a haptic module configured to generate a haptic effect; and
a controller configured to output a first control signal for controlling the haptic module to generate a haptic effect corresponding to a chosen menu icon of the one or more menu icons.

31. The mobile terminal of claim 30, wherein, the controller is further configured to enter a menu corresponding to the chosen menu icon when the chosen menu icon is chosen again.

32. The mobile terminal of claim 31, wherein the controller is further configured to output a second control signal for controlling the haptic module to generate a haptic effect corresponding to the entered menu.

33. A mobile terminal, comprising:
a wireless communication unit configured to connect a call;
a haptic module configured to generate a haptic effect; and
a controller configured to:
receive a request for connecting a call from a caller to detect caller information regarding the caller;
output a first control signal for controlling a haptic module to generate a haptic effect corresponding to the caller information; and
output a second control signal for controlling the haptic module to generate a haptic effect corresponding to a predefined word when a voice signal corresponding to the predefined word is received during the call with the caller.

* * * * *